US011242161B1

(12) United States Patent
White

(10) Patent No.: US 11,242,161 B1
(45) Date of Patent: Feb. 8, 2022

(54) CUBE-SHAPED PRIMARY STRUCTURE MODULE

(71) Applicant: David Michael White, Naperville, IL (US)

(72) Inventor: David Michael White, Naperville, IL (US)

( * ) Notice: Subject to any disclaimer, the term of this patent is extended or adjusted under 35 U.S.C. 154(b) by 197 days.

(21) Appl. No.: 16/422,889

(22) Filed: May 24, 2019

Related U.S. Application Data

(60) Provisional application No. 62/676,076, filed on May 24, 2018.

(51) Int. Cl.
| | | |
|---|---|---|
| *B64G 1/50* | (2006.01) | |
| *B64G 1/10* | (2006.01) | |
| *B33Y 80/00* | (2015.01) | |
| *B33Y 10/00* | (2015.01) | |
| *E04B 1/19* | (2006.01) | |

(52) U.S. Cl.
CPC ............... *B64G 1/10* (2013.01); *B64G 1/50* (2013.01); *E04B 1/19* (2013.01); *B33Y 10/00* (2014.12); *B33Y 80/00* (2014.12); *B64G 2001/1092* (2013.01); *E04B 2001/1969* (2013.01)

(58) Field of Classification Search
None
See application file for complete search history.

(56) References Cited

U.S. PATENT DOCUMENTS

| | | | | | |
|---|---|---|---|---|---|
| 3,709,447 | A | * | 1/1973 | Devlin | B64G 1/12 244/159.4 |
| 4,276,726 | A | * | 7/1981 | Derus | E04B 1/3441 248/166 |
| 4,539,786 | A | * | 9/1985 | Nelson | B64G 9/00 244/159.5 |
| 4,579,302 | A | * | 4/1986 | Schneider | B64G 9/00 136/292 |
| 5,755,406 | A | * | 5/1998 | Aston | B64G 1/1007 244/159.4 |
| 5,848,767 | A | * | 12/1998 | Cappa | B64G 1/22 244/158.1 |
| 6,206,327 | B1 | * | 3/2001 | Benedetti | B64G 1/10 244/159.4 |
| 9,657,489 | B2 | * | 5/2017 | Harper | B64C 1/12 |
| 9,887,401 | B2 | * | 2/2018 | Aston | H01M 10/6551 |
| 10,086,923 | B2 | * | 10/2018 | Seack | B64C 1/10 |
| 10,220,966 | B2 | * | 3/2019 | Koehler | B64G 1/26 |

(Continued)

FOREIGN PATENT DOCUMENTS

| | | | |
|---|---|---|---|
| CN | 102975867 B | * | 12/2014 |
| CN | 103863577 B | * | 2/2016 |
| CN | 107554818 A | * | 1/2018 |

*Primary Examiner* — Jacob J Cigna
(74) *Attorney, Agent, or Firm* — Johnson & Associates

(57) ABSTRACT

A method and apparatus provides cube-shaped satellite primary structures, each comprised of six identical, or nearly identical, rectangular truss panels and internal struts. The struts, all adjustable in length, connect, and are directed between all cube opposite corners and all cube opposite panel centers. All struts meet at the cube center where they attach rigidly to either a block called the "nucleus fitting" or to a hollow sphere. Each strut attaches to either a ball-socket corner fitting located at the interior corner of the cube, or to a ball-socket panel center fitting located at the panel center interior to the cube.

18 Claims, 27 Drawing Sheets

(56) References Cited

U.S. PATENT DOCUMENTS

| | | | |
|---|---|---|---|
| 10,538,341 B1* | 1/2020 | Fraze | B29C 64/10 |
| 10,589,878 B2* | 3/2020 | Veto | B64G 1/402 |
| 10,640,237 B2* | 5/2020 | Dunn | B64G 1/002 |
| 10,647,081 B2* | 5/2020 | Hull | B32B 27/281 |
| 10,774,518 B1* | 9/2020 | Eller | E04B 1/2403 |
| 11,077,961 B2* | 8/2021 | Grigaliunas | B64G 1/283 |
| 2006/0185277 A1* | 8/2006 | Quincieu | B64G 1/10 52/265 |
| 2015/0210408 A1* | 7/2015 | Dunn | B33Y 80/00 244/159.4 |
| 2016/0288931 A1* | 10/2016 | Field | B64G 1/66 |
| 2016/0362905 A1* | 12/2016 | Harper | E04C 2/08 |
| 2019/0023424 A1* | 1/2019 | Helvajian | B64G 1/10 |

\* cited by examiner

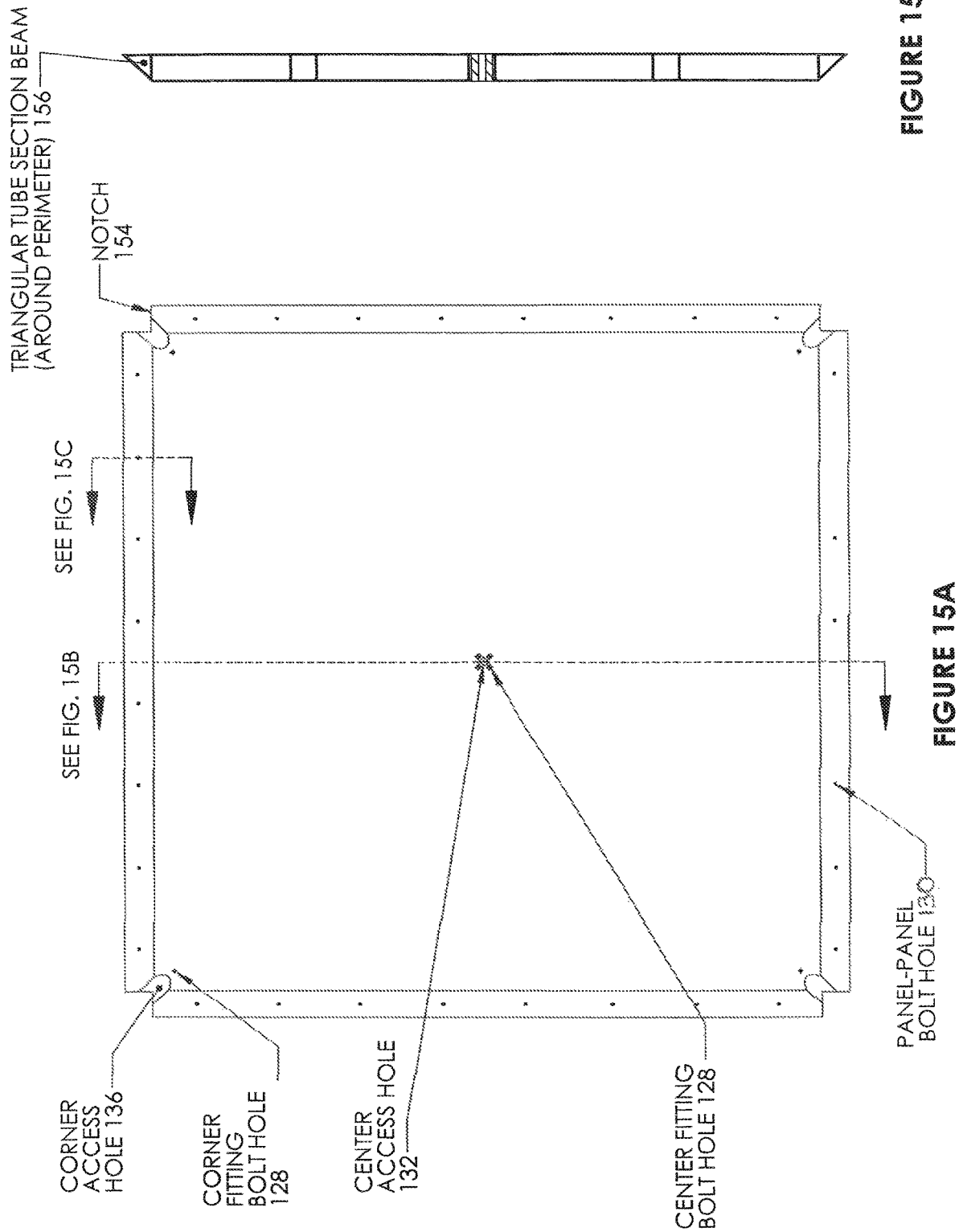

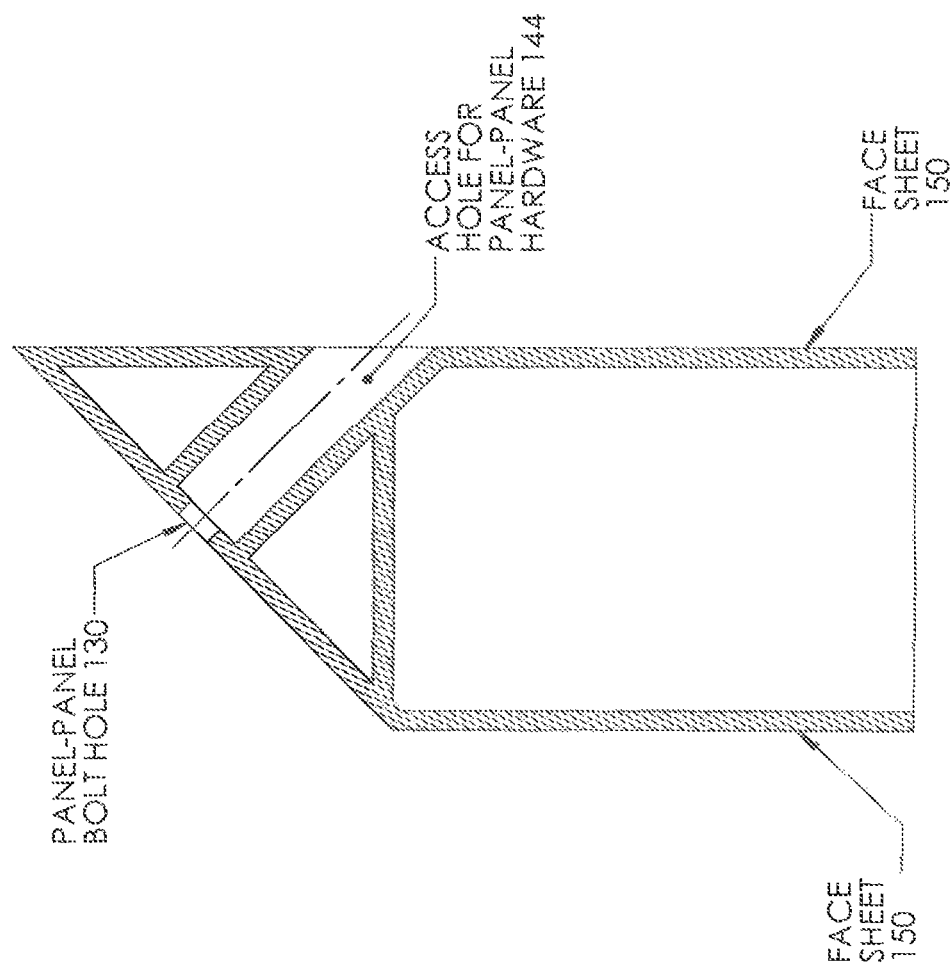

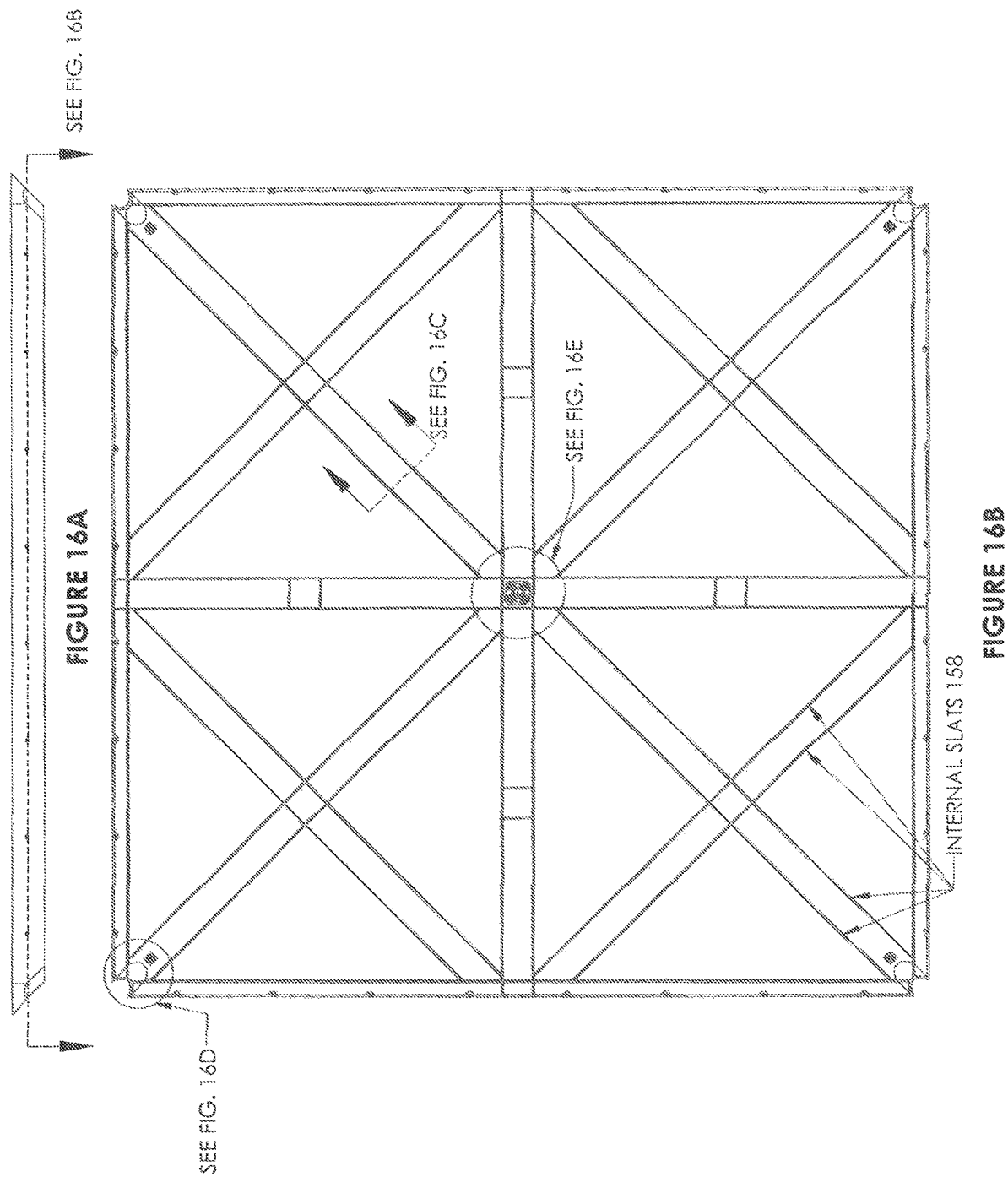

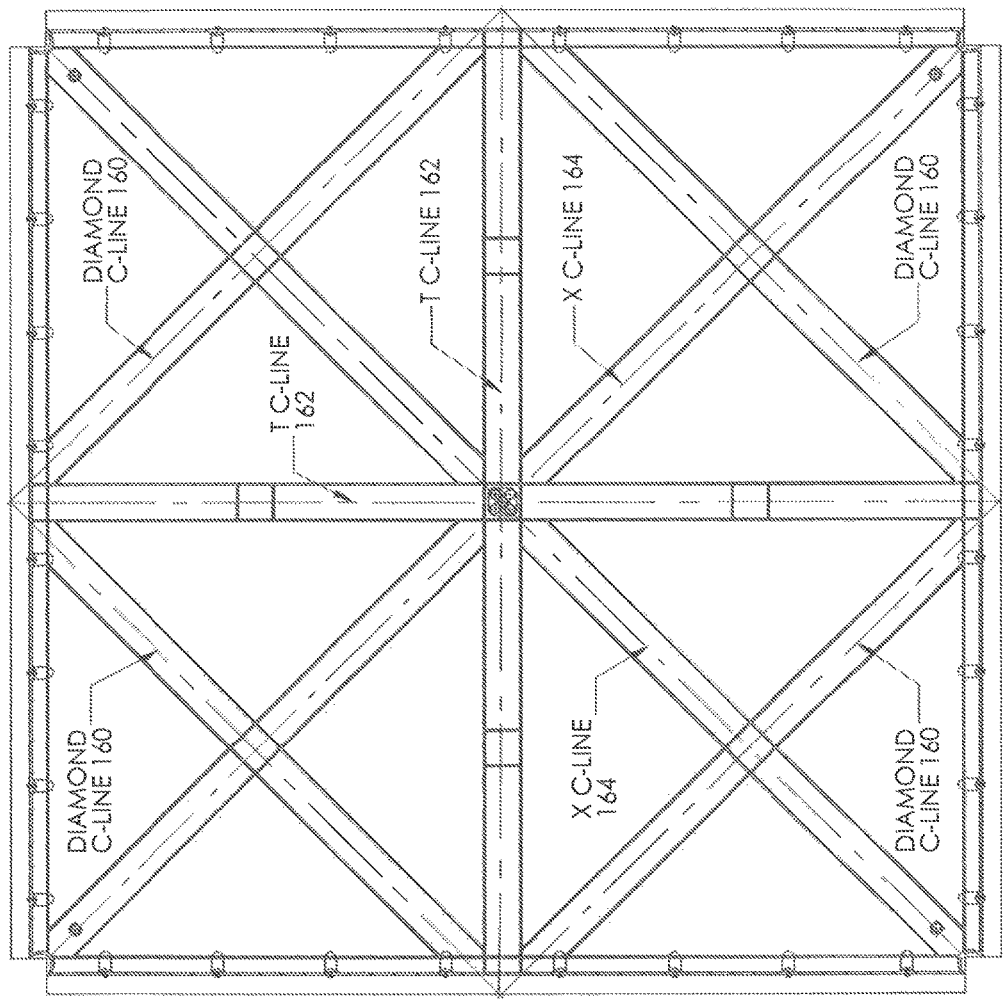

CUBE-SHAPED PRIMARY STRUCTURE MODULE

CROSS REFERENCE TO RELATED APPLICATIONS

This application claims priority under 35 U.S.C. § 119 to, commonly owned U.S. provisional patent application Ser. No. 62/676,076 filed on May 24, 2018, entitled "TRUSS SAT CUBE-SHAPED PRIMARY STRUCTURE MODULE", which is incorporated by reference herein.

FIELD OF THE INVENTION

This invention relates to the field of satellites. In particular, this invention is drawn to cube-shaped satellite primary structure comprised of six identical, or nearly identical, rectangular truss panels and internal struts.

BACKGROUND OF THE INVENTION

Satellite primary structures traditionally include exterior panels, interior panels, rectangular tube corner posts, panel-attached external stiffening beams, struts, fittings to attach panels to panels, fittings to attach struts to panels, and panel local reinforcements such as added face sheet and internal pockets of syntactic foam.

Satellite thermal control subsystems traditionally include heat pipes internal to panels, heat pipes external to panels, brackets that connect heat pipes to heat pipes and heat pipes to panels, thermal doublers (added face sheet), electrical strip heaters, coatings, paint, heat sinks, and thermal blankets.

Typical panels are comprised of foil honeycomb sandwiched between and bonded to two face sheets. Some panels contain embedded heat pipes specially designed to help spread heat throughout the panel through liquid-gas phase change and capillary action of ribs internal to heat pipes. Panels typically have several bushings and threaded inserts, pockets of syntactic foam, and face sheet doublers for structural reinforcement and thermal conduction aid. These composite panels are expensive and time consuming to design, manufacture, modify, and repair.

Heat pipes aid in conducting heat from the interior sides of radiator panels where hot electronic units are mounted to the exterior side where heat is radiated to space. They do this more efficiently than the surrounding honeycomb foil due to their larger metallic cross section. They also aid in heat conduction along the panel in the direction of the heat pipe axis, not only due to gas-liquid phase change and capillary action mentioned previously, but because they are much thicker than the composite panel's face sheet. Non radiating panels with hot units typically have heat pipes that bend to make contact with the radiator panel heat pipes. All of these heat pipes are expensive, time consuming in manufacturing, heavy, and complicate other subsystem designs and their methods to mount to panels. Much time is spent with different subsystem design departments making decisions and iterating changes to their CAD layouts and drawings. These subsystems include primary structures, propulsion, power, thermal control, electronics, RF waveguide plumbing, and antenna support structures. Also, manufacturing and analysis personnel are involved with these design change iterations.

Separate rectangular tube corner posts, panels interior to the cube, and panel stiffening beams external to the panels typically obstruct the mounting of electronic units, propulsion lines, RF wave guides, electrical harnesses, and antenna support structures. Said structures therefore typically have to be modified with holes, notches and reinforcements during the initial design phase or after build has begun. This increases time required to design, analyze, manufacture, and test thus increasing costs and delaying delivery.

SUMMARY OF THE INVENTION

A cube-shaped satellite structure includes six truss panels each formed using one continuous metallic material, the six truss panels coupled together to form a cube shape with a hollow interior. Each of the truss panels further comprise opposing first and second face sheets forming a rectangular panel having a mostly hollow interior, four edges, each edge tapered approximately 45 degrees to make contact with an edge of four adjacent truss panels, and an internal lattice structure comprised of internal slats disposed perpendicular to the first and second face sheets, the internal slats forming a diamond shaped beam coupling midpoints of adjacent edges of the truss panel, a T-shaped beam coupling the midpoints of opposite edges the truss panel, an X-shaped beam coupling opposite corners of the truss panel, and a rectangular shaped beam formed along the perimeter of the truss panel. The structure also includes four corner struts, each corner strut coupled to opposite corners of the cube-shaped satellite structure and three side struts, each side strut coupled to the center of opposite truss panels. The structure also includes a nucleus fitting disposed proximate the center of the cube-shaped satellite structure, wherein each corner strut is comprised of first and second portions coupled between a corner of the cube-shaped satellite structure and the nucleus fitting, and wherein each side strut is comprised of first and second portions coupled between a center of a truss panel of the cube-shaped satellite structure and the nucleus fitting.

Another embodiment provides a method of forming a cube-shaped satellite structure, the method including providing six truss panels formed using one continuous metallic material, wherein each truss panel further comprises opposing first and second face sheets forming a rectangular panel having a mostly hollow interior, four edges, each edge tapered approximately 45 degrees to make contact with an edge of four adjacent truss panels, and an internal lattice structure comprised of internal slats disposed perpendicular to the first and second face sheets, the internal slats forming a diamond shaped beam coupling midpoints of adjacent edges of the truss panel, a T-shaped beam coupling the midpoints of opposite edges the truss panel, an X-shaped beam coupling opposite corners of the truss panel, and a rectangular shaped beam formed along the perimeter of the truss panel. The method includes coupling the six truss panels together to form a cube shape with a hollow interior, providing a nucleus fitting disposed proximate the center of an assembled cube-shaped satellite structure, providing four corner struts having first and second portions, coupling each corner strut portion to a corner of the cube-shaped satellite structure and the nucleus fitting, providing three side struts having first and second portions, and coupling each side strut portion to the center of a truss panel and the nucleus fitting.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIGS. 15A-15C show front and sectional views of a truss panel.

FIGS. 16A-16E show an edge view, full section view, partial section views, and enlarged sectional views of a truss panel.

FIGS. 17A-17B show an edge view and a sectional view of a truss panel.

DETAILED DESCRIPTION

Cube

Figure 1:
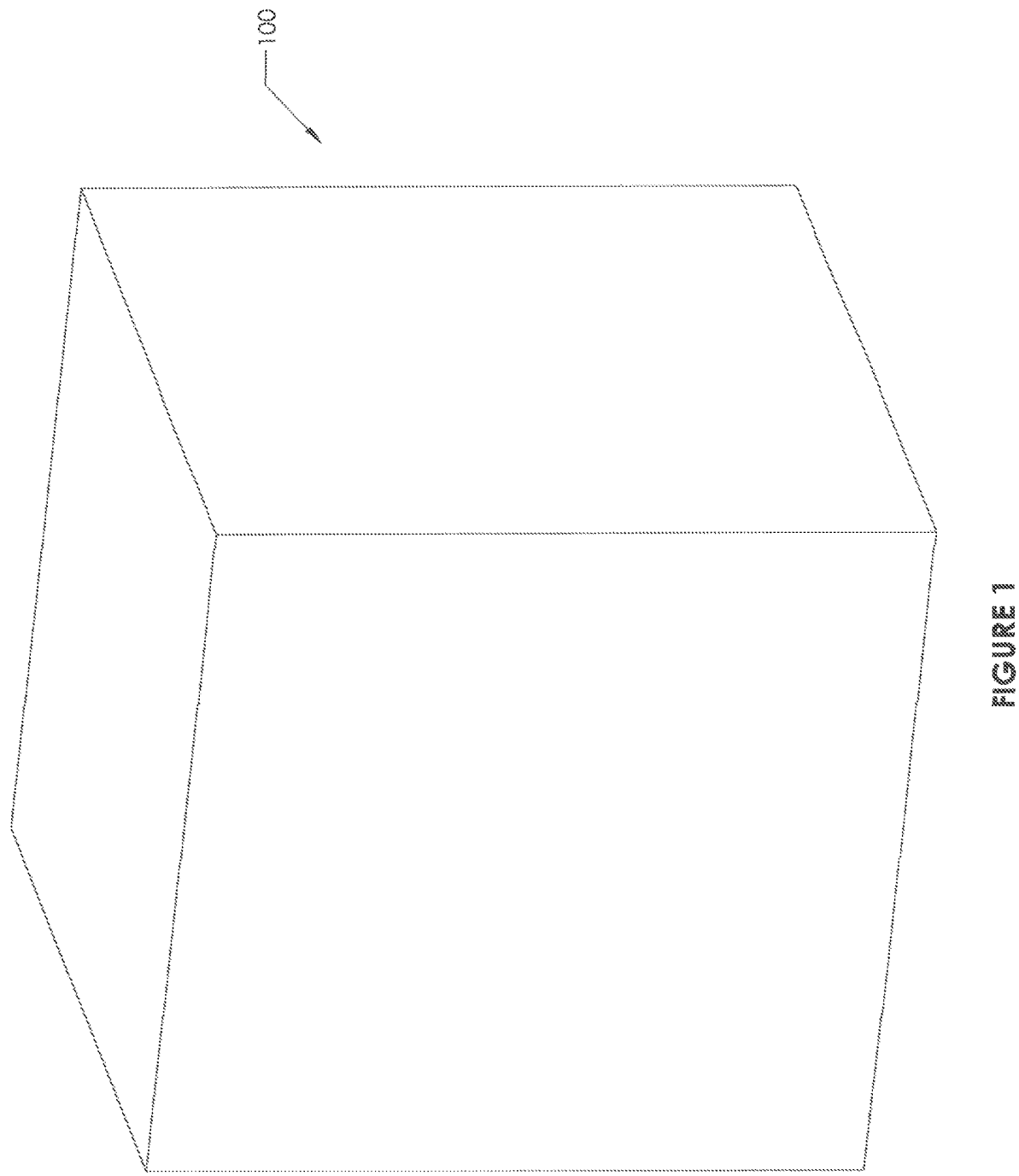
FIG. 1 is an isometric view of a cube-shaped structure (100).

This invention relates to a cube-shaped satellite primary structure (100) comprised of six identical, or nearly identical, rectangular truss panels (102) and internal struts (104, 106) (see FIGS. 1, 2, 7, and 8). The struts, all adjustable in length, connect, and are directed between all cube opposite corners and all cube opposite panel centers. All struts meet at the cube center where they attach rigidly to either a block called the "nucleus fitting" (112) or to a hollow sphere (166). Each strut attaches to either a ball-socket corner fitting (108) located at the interior corner of the cube, or to a ball-socket panel center fitting (110) located at the panel center interior to the cube.

Truss Panels

FIGS. 9-17 show various views of exemplary truss panels (102), some views with the truss panels (102) assembled with others (FIGS. 9-14). Preferably, all panels (102) are each made up of one piece of continuous metallic material. This is made possible by 3D printing. Each panel has all four of it's edges tapered at 45 degrees to make full contact with it's adjacent four panels except for notches (154). All interfaces between panels have a sandwiched gasket (148), such as graphite film, that helps fill voids and provide enhanced thermal and electrical conduction between panels. Bolts (inserted through bolt holes 130) spaced evenly along panel-to-panel interfaces ensure enough compression of the gasket to close voids and provide adequate load transfer between panels. Each panel is hollow except containing a lattice arrangement of internal slats (158) oriented perpendicular to the panel's main plane and forming internal beams that form a diamond (160), a T (162), an X (164), and a rectangle (along the perimeter). Centerlines of beams that form the diamond connect panel edge midpoints with adjacent edge midpoints. Centerlines of beams that form the T connect panel edge midpoints with opposite edge midpoints. Centerlines of beams that form the X connect panel corners with opposite corners. Diamond, T, and X beams have rectangular cross sections (FIGS. 16B, 16C), while perimeter beams, that form a rectangle, have triangular cross sections due to the panels' 45 degree tapered edges (156 of FIG. 15B, 15C). The internal beam layouts described above are the minimum needed for structural purposes, in some examples. Additional slats or beams could be added as needed in the design phase to aid in thermal conduction through panels for hot electrical units or to add local strengthening or stiffening of the panels where there is mounting of heavy equipment such as batteries, motors, solar panels, and antenna support structures.

Nucleus Fitting

Figure 2:
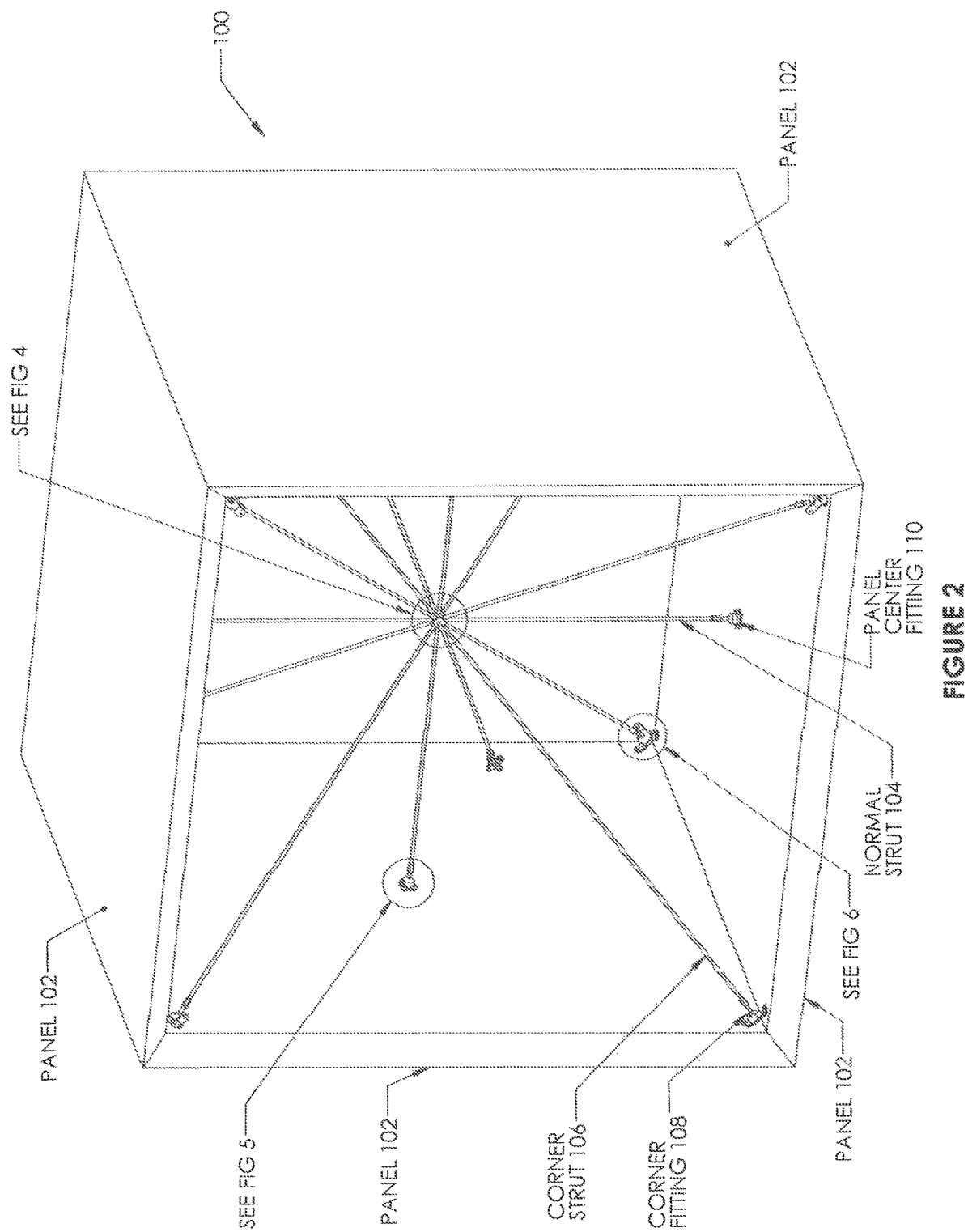
FIG. 2 is an isometric view of the cube-shaped structure shown in FIG. 1, with one side panel removed.
Figure 3:
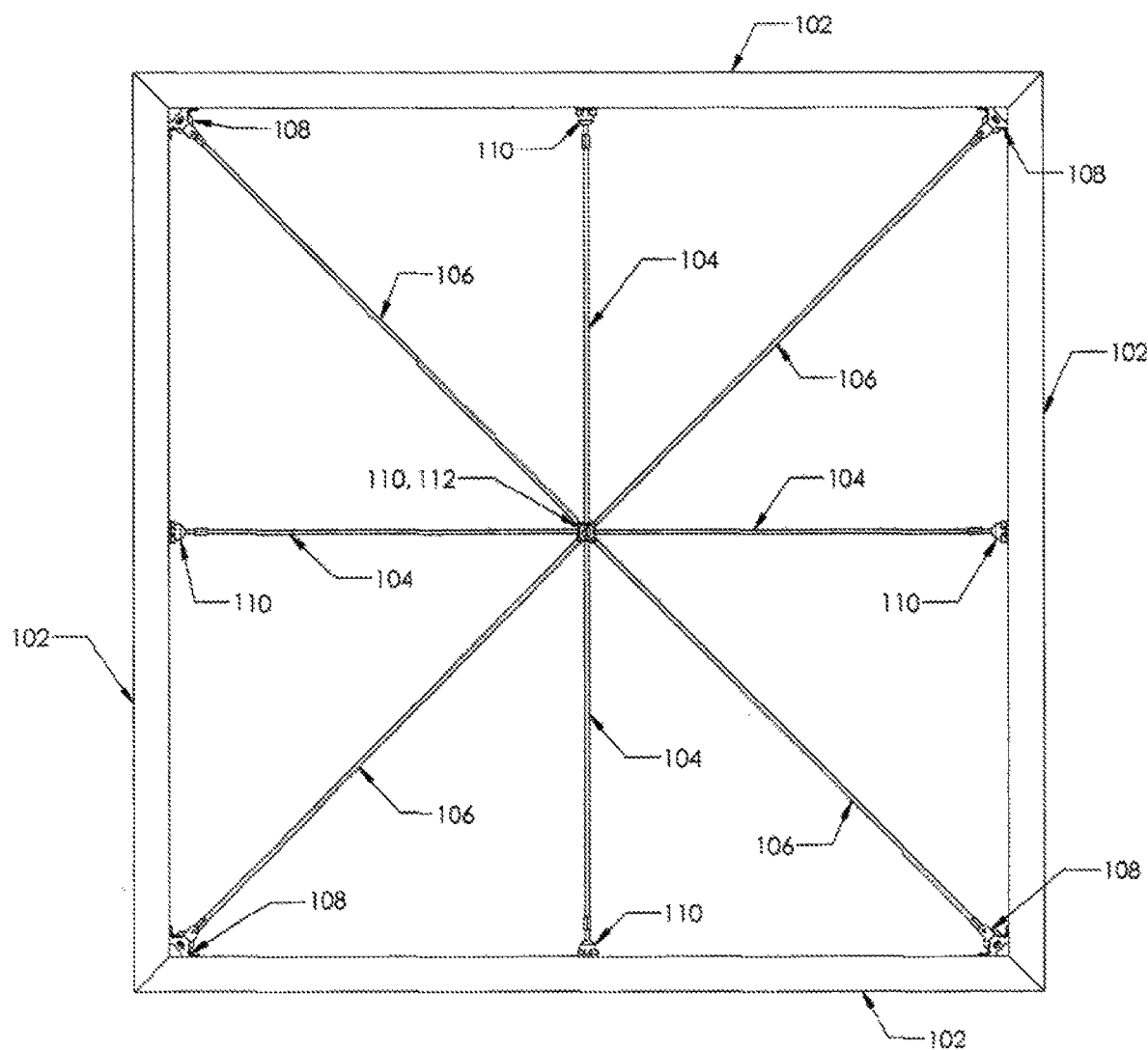
FIG. 3 is a side view of the cube-shaped structure shown in FIG. 2.
Figure 4:
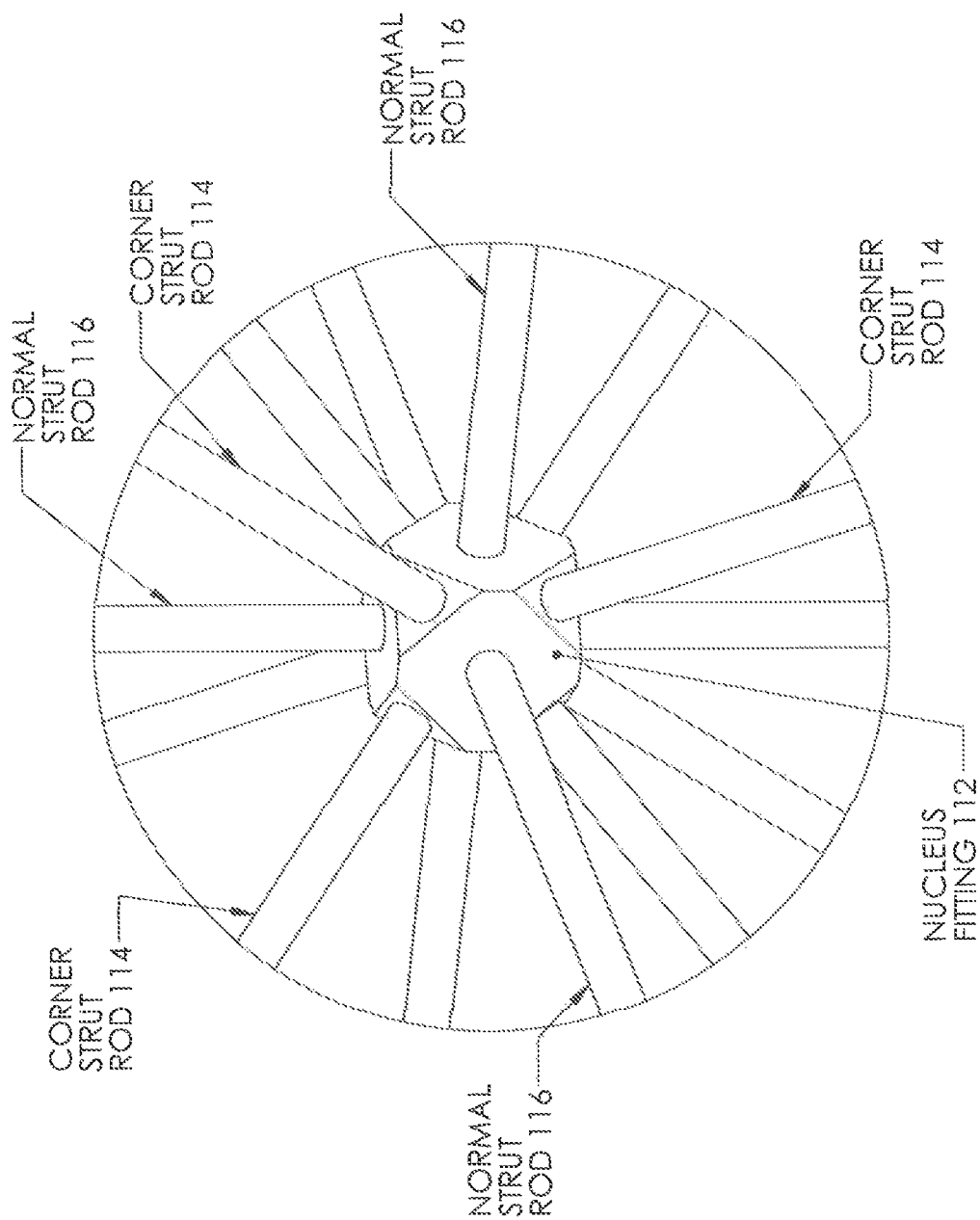
FIG. 4 is an enlarged partial isometric view of the nucleus fitting (112) and corresponding struts shown in FIGS. 2 and 3.
Figure 5:
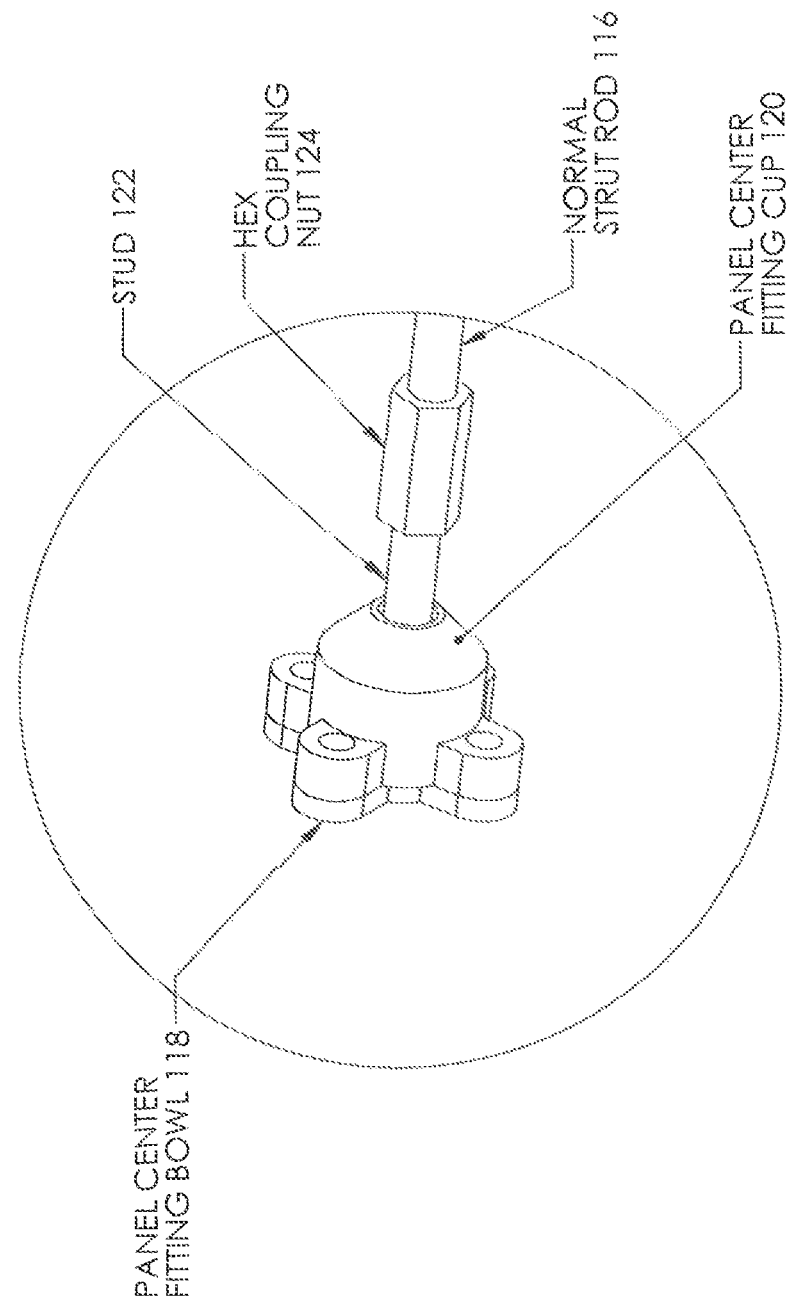
FIG. 5 is an enlarged partial isometric view of the panel center fitting (110) and normal (or "side") strut (104) shown in FIGS. 2 and 3.
Figure 6:
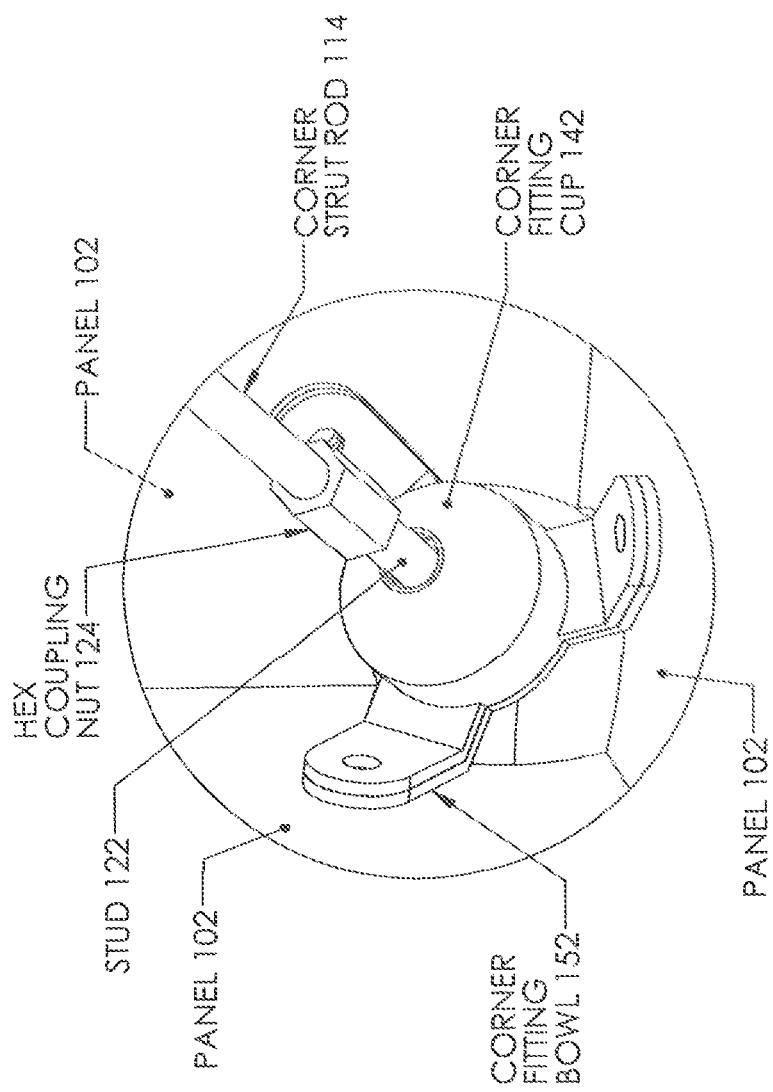
FIG. 6 is an enlarged partial isometric view of the corner fitting (108) and corner strut (106) shown in FIGS. 2 and 3.
Figure 7:
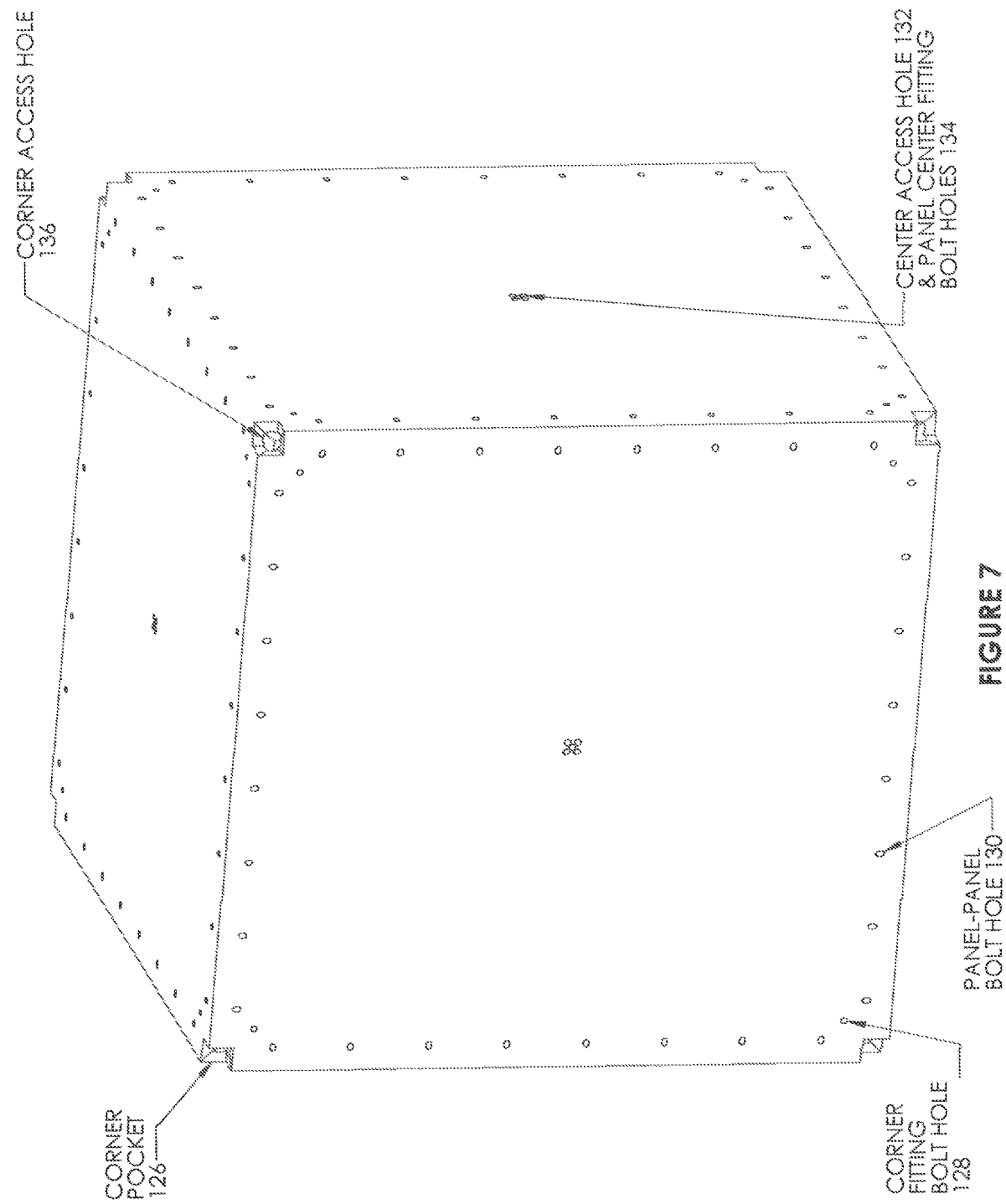
FIG. 7 is an isometric view of the cube-shaped structure (100) shown in FIG. 1, showing access holes and fastener holes.
Figure 8:
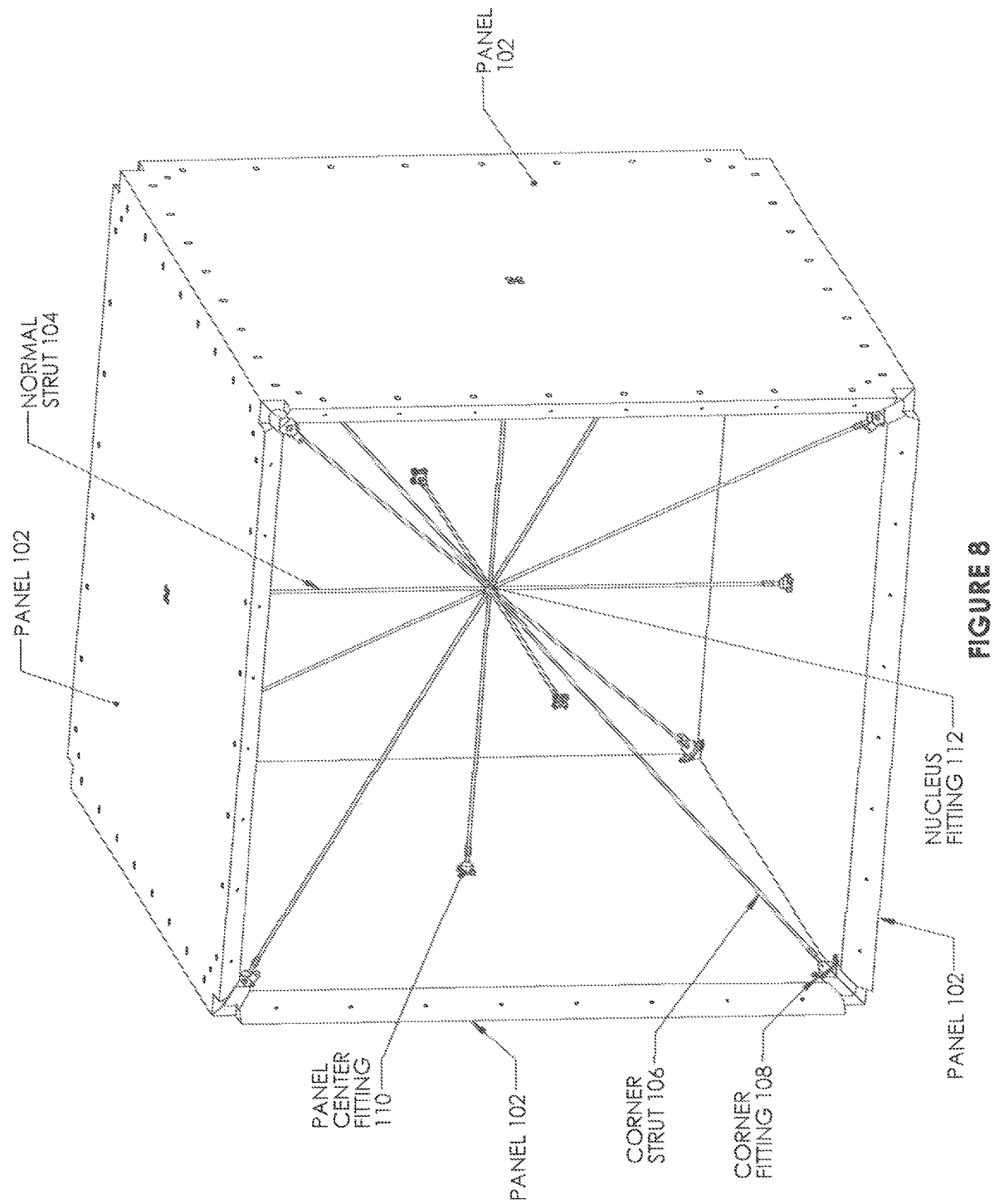
FIG. 8 is an isometric view of the cube-shaped structure shown in FIG. 7, with one side panel removed.
Figure 9:
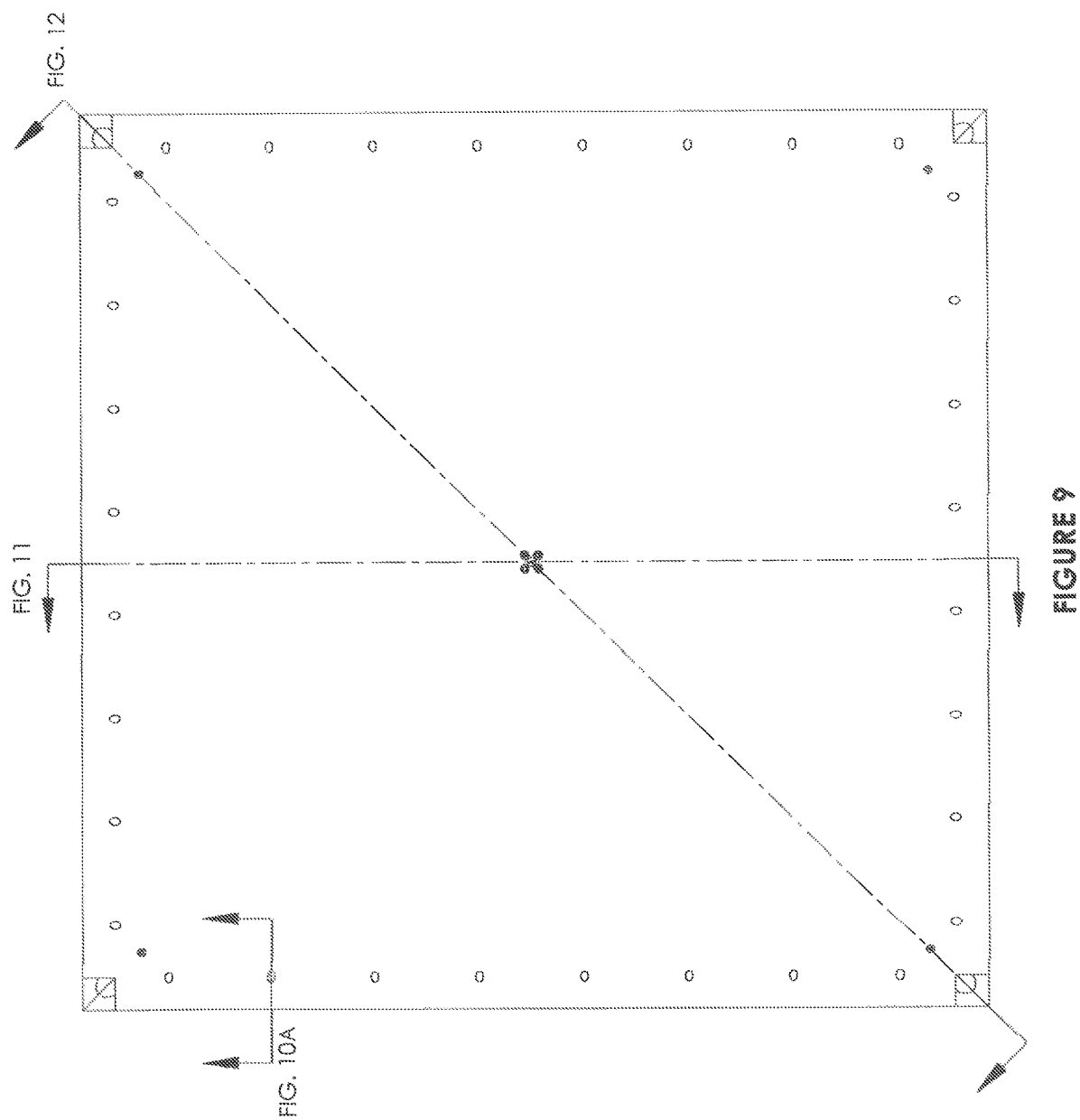
FIG. 9 is a side view of the cube-shaped structure shown in FIG. 7.
Figure 10:
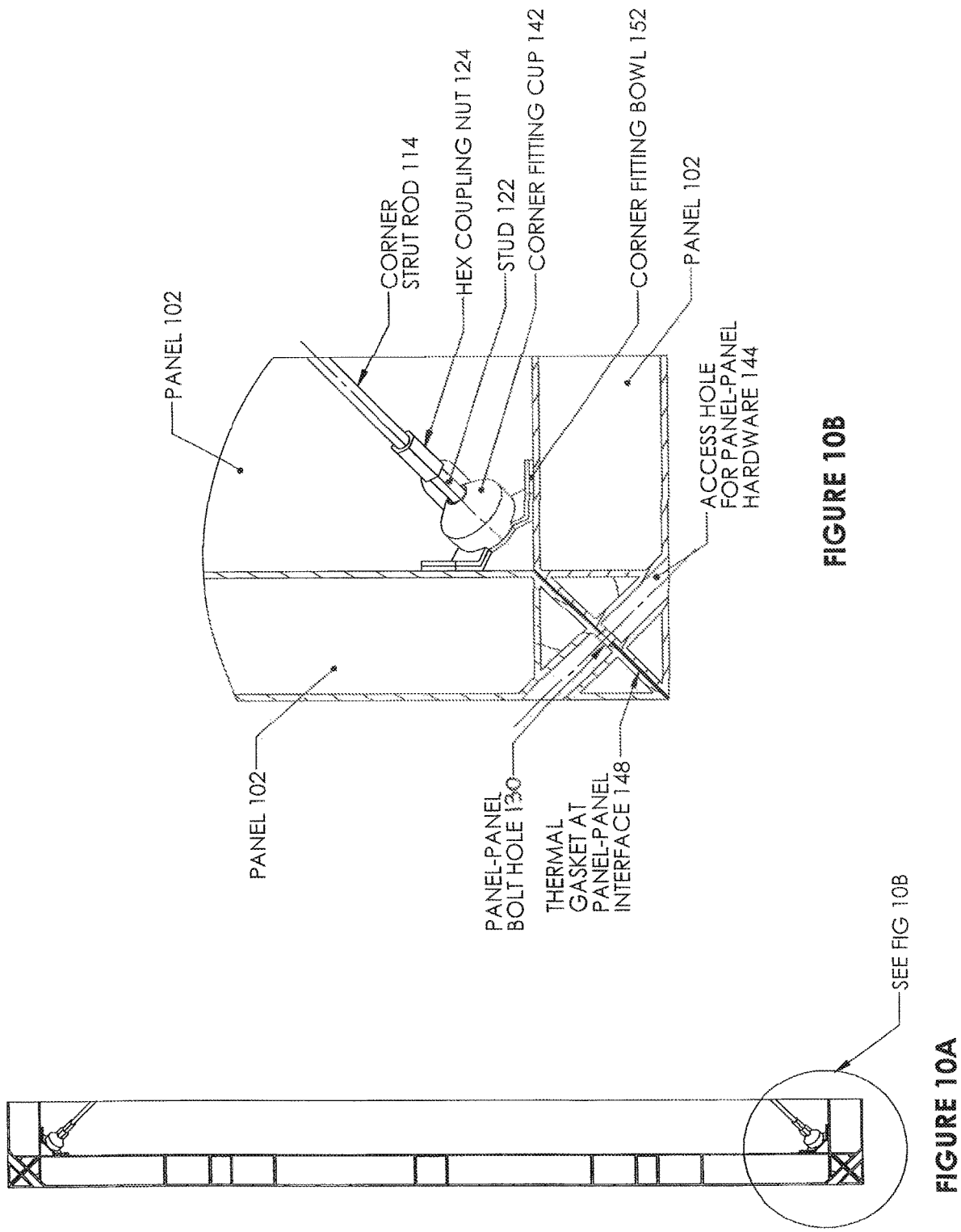
FIG. 10A is a partial sectional view of the cube-shaped structure shown in FIG. 9.
FIG. 10B is an enlarged partial view of FIG. 10A.
Figure 11:
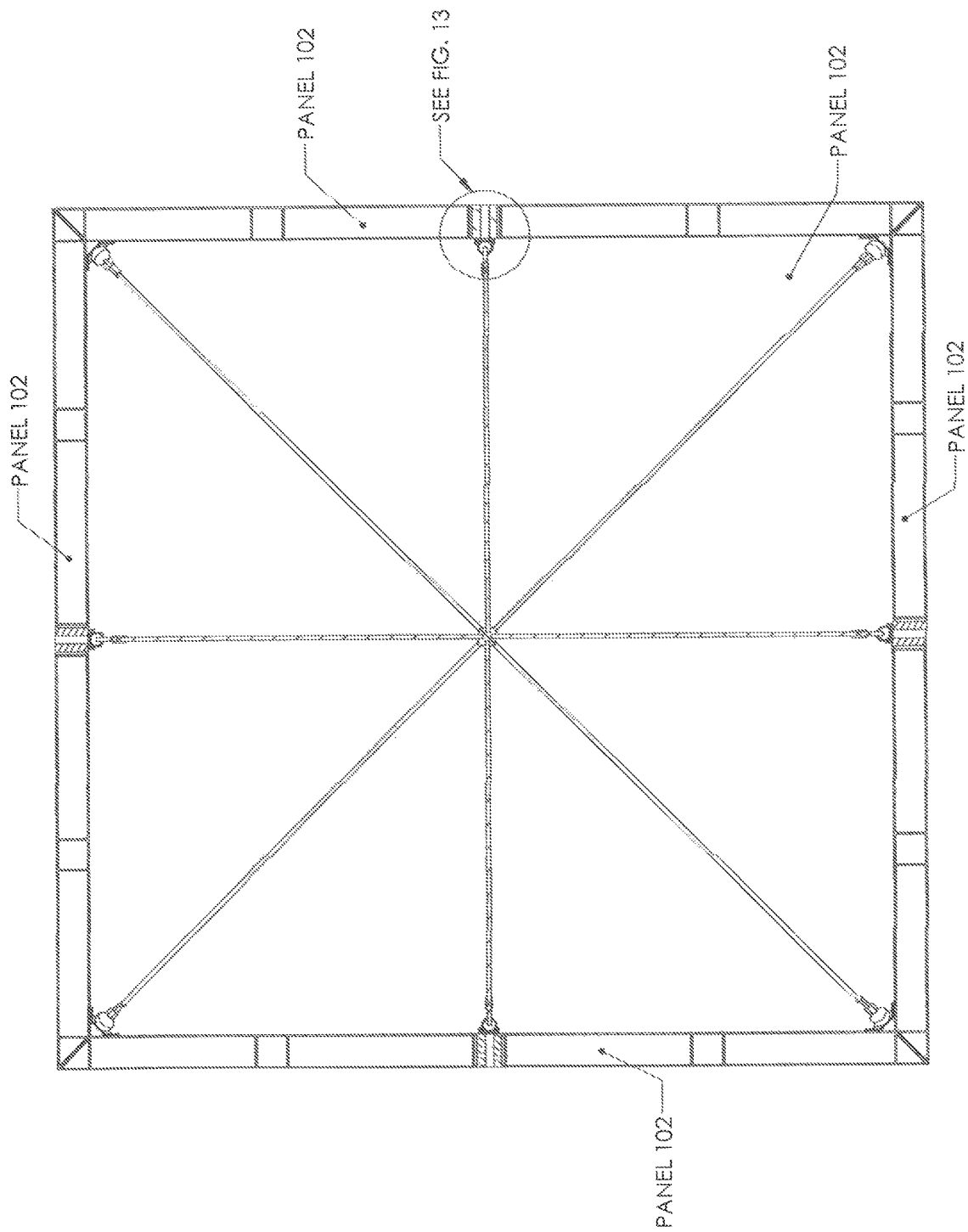
FIG. 11 is a sectional side view of the cube-shaped structure shown in FIG. 9.
Figure 12:
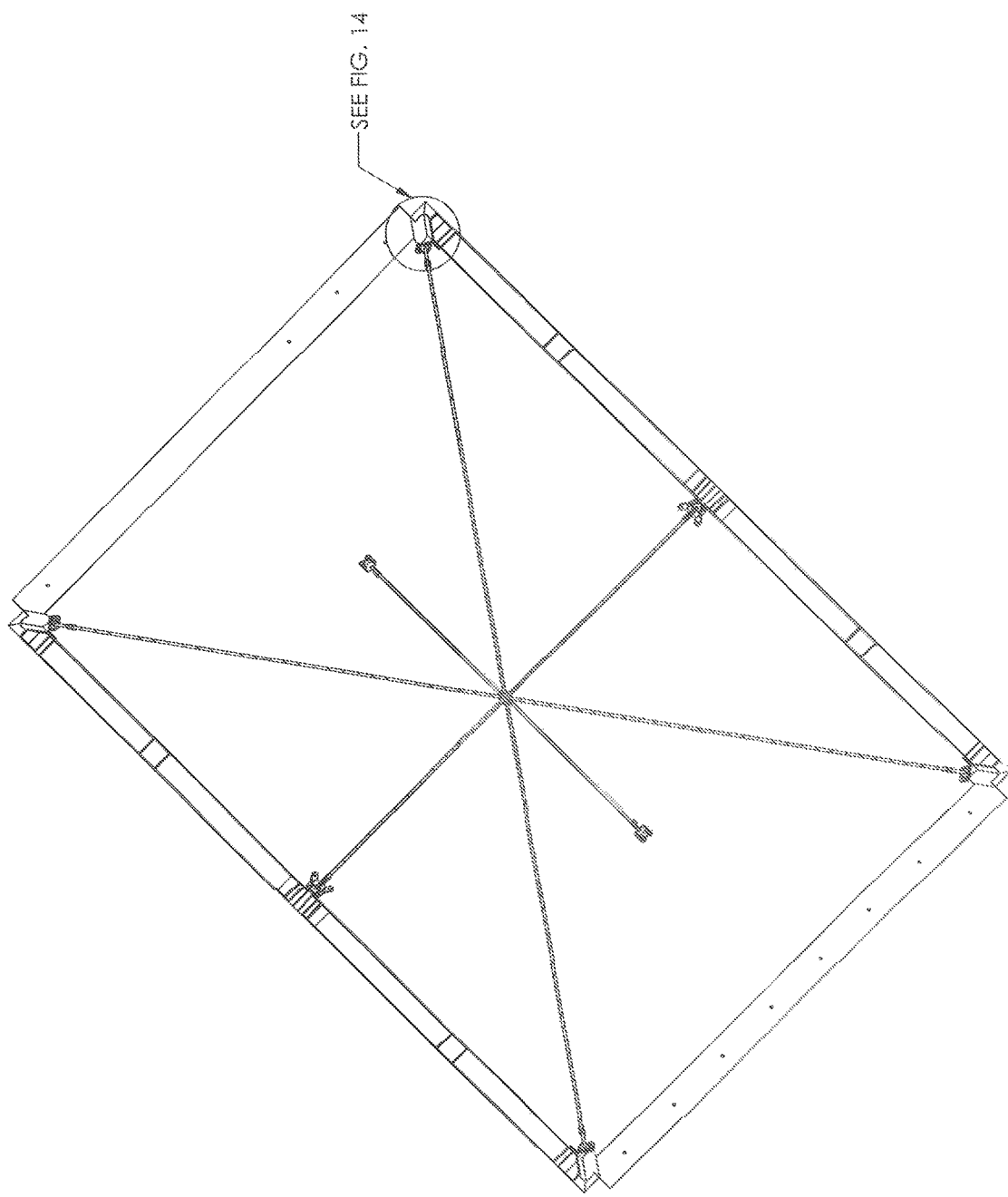
FIG. 12 is a sectional side view of the cube-shaped structure shown in FIG. 9.
Figure 13:
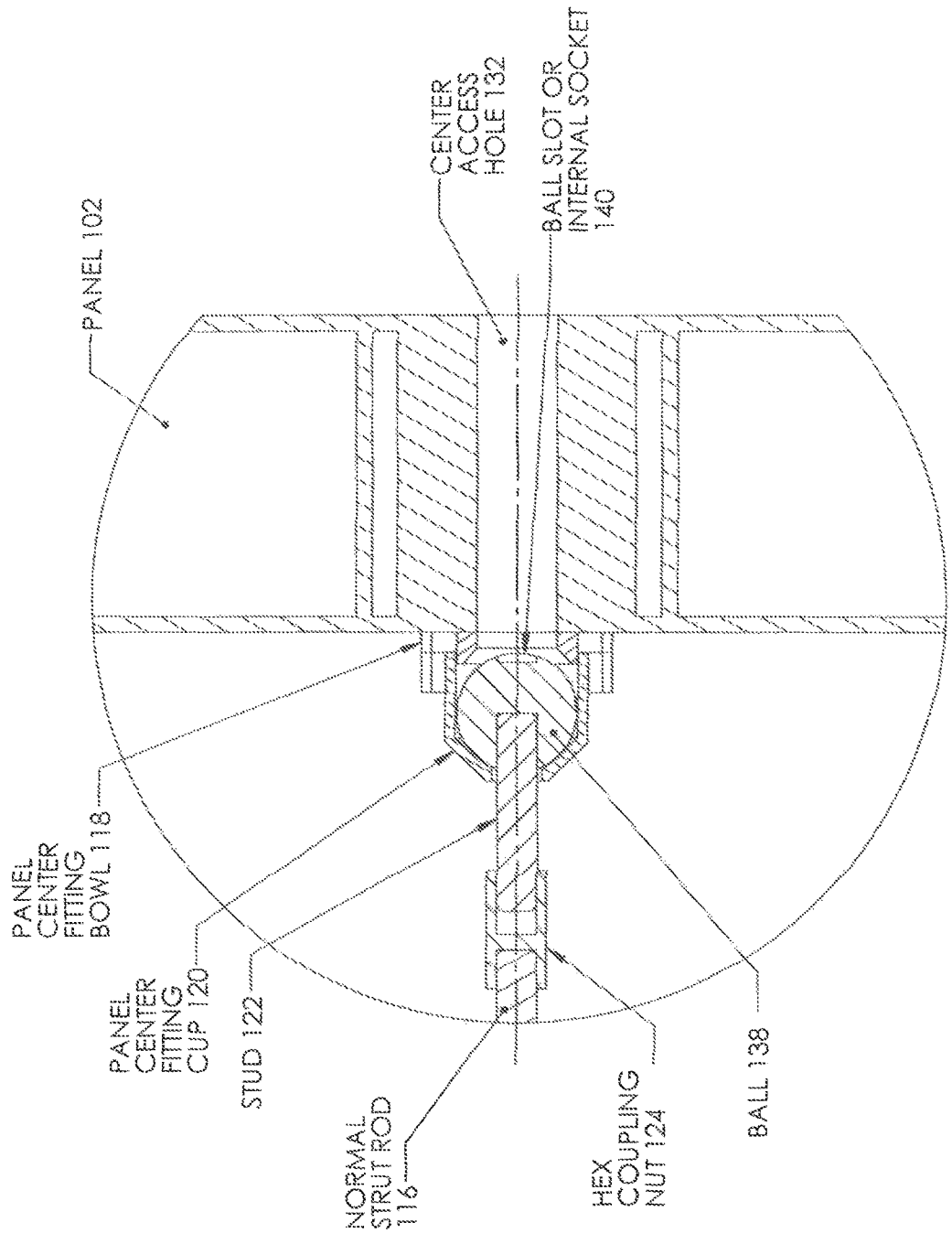
FIG. 13 is an enlarged partial view of the cube-shaped structure shown in FIG. 11.
Figure 14:
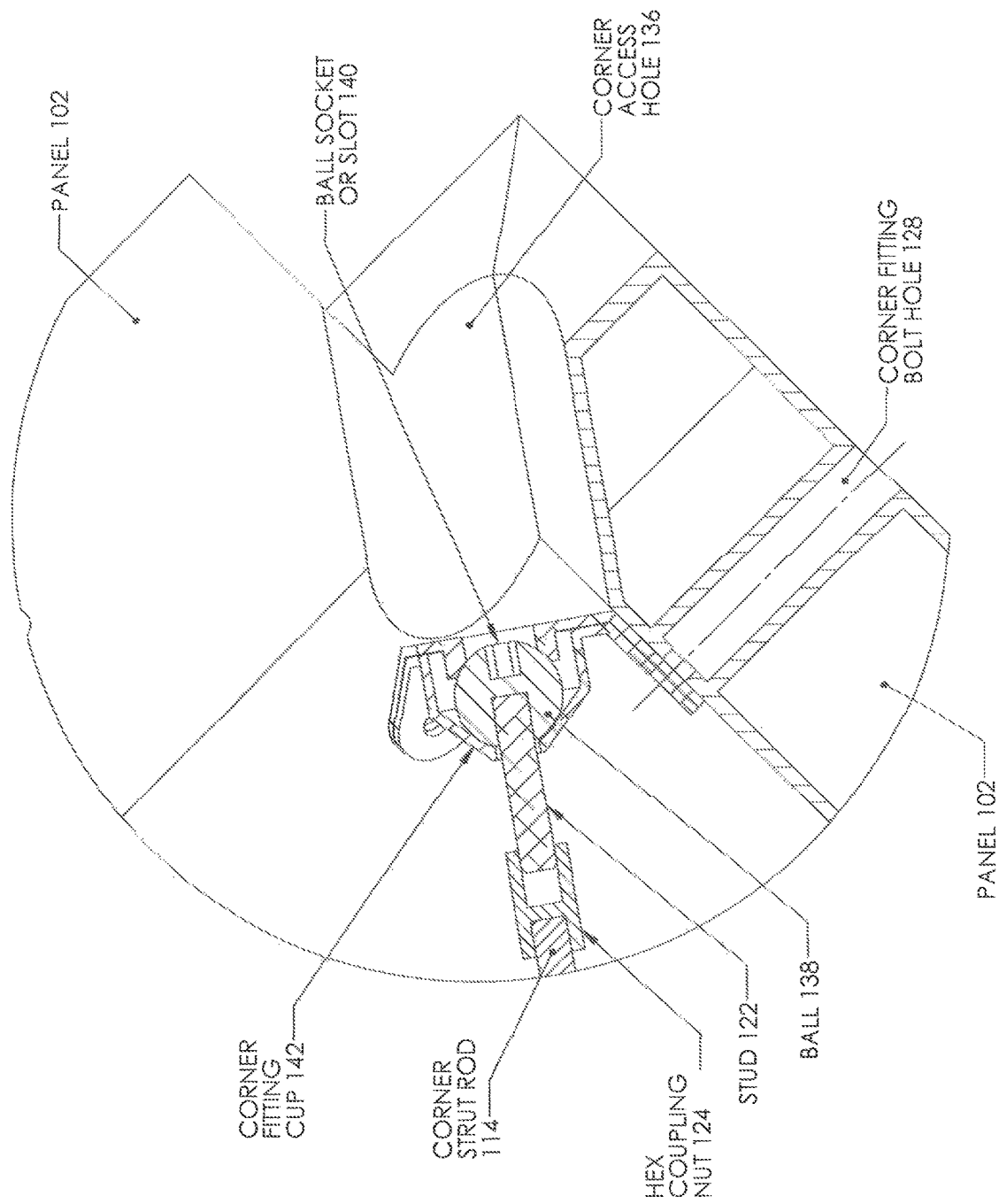
FIG. 14 is an enlarged partial view of the cube-shaped structure shown in FIG. 12.
Figure 16E:
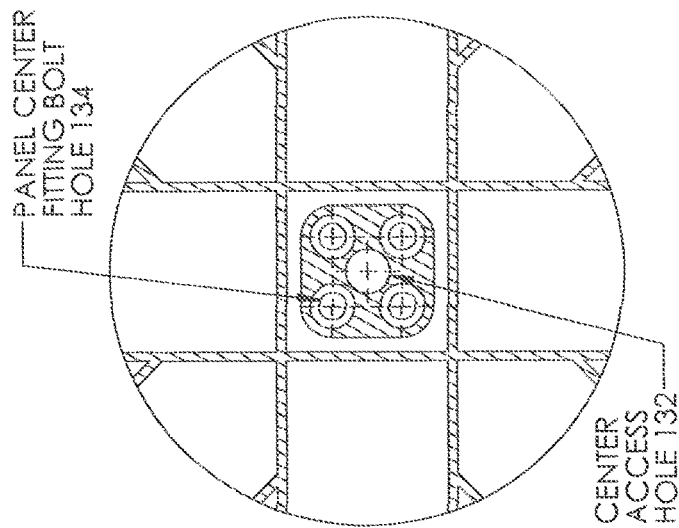
Figure 16D:
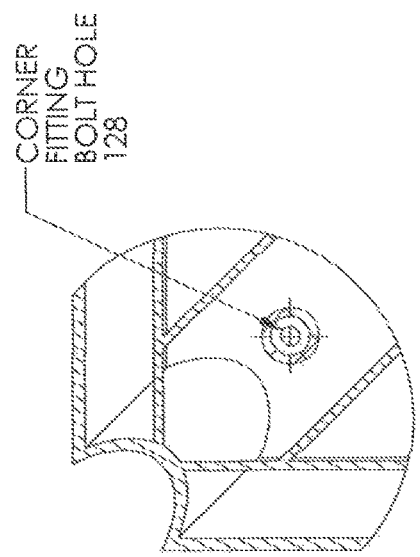
Figure 16C:
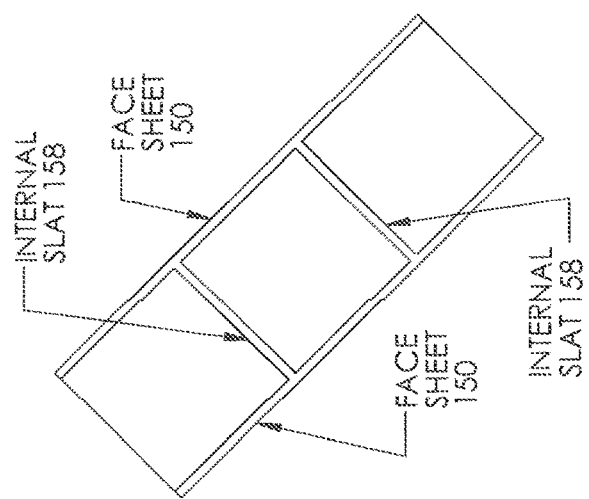

The nucleus fitting (112) resides at the center of the cube formed by the six said panels and is comprised of a block of metal that represents a cube with it's eight corners cut off (see FIGS. 2 and 4). The six identical main sides of the nucleus cube are parallel with the six outer panels. The eight identical surfaces created by cutting off the corners of the nucleus cube face toward the corners of the outer cube formed by the panels; i.e. an axis drawn from their centroid and perpendicular to their triangular shaped surface would travel directly toward outer cube corners where three panels meet. At the centroid of each of 14 surfaces of the nucleus block is a blind threaded hole. The axis of each hole is perpendicular to the surface into which it is drilled.

Struts

Corner struts (106) and normal (or "side") struts (104) thread directly (attach rigidly) to either a nucleus fitting (112) or a hollow sphere (166) (such as the fuel tank shown in FIG. 24) on one end central to the cube and to a ball socket at cube corner fittings (108) and panel center fittings (110) (see FIGS. 2-6, 8, 11, 12, and 24). Main strut components are: round rod or tube (externally fully threaded or threaded only on ends) (114, 116), internally-threaded hex coupling nut (124), fully-externally-threaded stud (122), and ball (138 in FIGS. 13-14).

Rods

Metallic rods or tubes (114, 116) have circular cross sections and are either fully threaded or have threaded ends. They also may contain flats for wrenching. There are eight identical or nearly identical corner strut rods (114) and six identical or nearly identical normal strut rods (116) (see FIGS. 4-6).

Nucleus Fitting End of Rods

All six normal strut rods and eight corner strut rods fully thread into all the threaded blind holes of the nucleus fitting and are kept from loosening by a locking element such as the addition of an adhesive (see FIG. 4).

Ball Socket End of Rods and Hex Coupling Nuts

All rod ends opposite of the nucleus block thread into hex coupling nuts (124 in FIGS. 5, 6, 10B, 13, and 14) and are kept from loosening by a locking element such as the addition of an adhesive. Hex nut ends may have opposite-handed threads so as to act as a jack screw when turned.

Stud, Ball, and Panel Fittings

Studs (122), of the same composition as the rods yet much shorter, thread into the hex coupling nuts on opposite sides of the rods and further from the nucleus fitting (see FIGS. 5, 6, 10A, 13, and 14). They are left free to rotate and translate relative to the hex coupling nuts. They may also have flats for wrenching. Metallic balls (138) each have a threaded blind hole on one side and a slot or internal socket (140) (such as hex or square) on the opposite side. They are attached to the stud ends opposite of the hex coupling nuts and are kept from loosening by the addition of a locking element such as an adhesive. All balls are contained within sockets of either two-piece corner fittings (108) or two-piece panel center fittings (110), depending on whether the ball is at the end of a corner strut (106) or a normal strut (104). Each of six panels has a panel center fitting attached to its center, interior to the cube formed by the six panels. Each of eight interior corners of the cube has a two-piece corner fitting that attaches to each of the three panels at its location. These corner and center fittings and/or the panels they attach to have oversized bolt clearance holes to allow for manufacturing dimensional tolerances. The joints involved may rely on friction between bolts, washers, fittings, brackets, and panels.

Suggested Corner Fitting Attachment Procedure

First, panels are bolted to adjacent panels. Next, corner fitting bowls (152) are bolted to panels. Studs, with balls on one end and hex coupling nuts on the other end, start fully inserted in the threaded blind holes of the hex coupling nuts. They are then rotated and extended an equal amount until balls seat in the corner fitting bowls. Corner fitting bowls and corner fitting cup (142) holes are aligned as best as possible to allow three bolts to be threaded into the corner fitting cup tapped holes.

Suggested Center Fitting Attachment Procedure

Studs, with balls on one end and hex coupling nuts on the other end, start fully inserted in the threaded blind holes of the hex coupling nuts. They are then rotated and extended an equal amount until balls seat in the panel center fitting bowls (118) as the fittings are flush with the panels. Fitting and panel holes are aligned as best as possible to allow four bolts to be threaded into the panel center fitting cup (120) tapped holes.

Suggested Strut Adjustment Procedure

Fine strut adjustments or strut preloads can be made from outside the cube via center access holes (132) and corner access holes (136). A tool such as a screwdriver or Allen key can be inserted into the ball slot/socket (140) and turned the desired amount thus extending or retracting the ball relative to the hex coupling nut (124). The ball should have a feature that allows it to be locked to the fitting or panel to prevent loosening. Alternatively, the stud could be adhesively bonded to the hex coupling nut, but this requires all adjustments to be made prior to the adhesive hardening, and then, after hardening, the adjustments are permanently set.

Panel Notches and Holes

Figure 18:
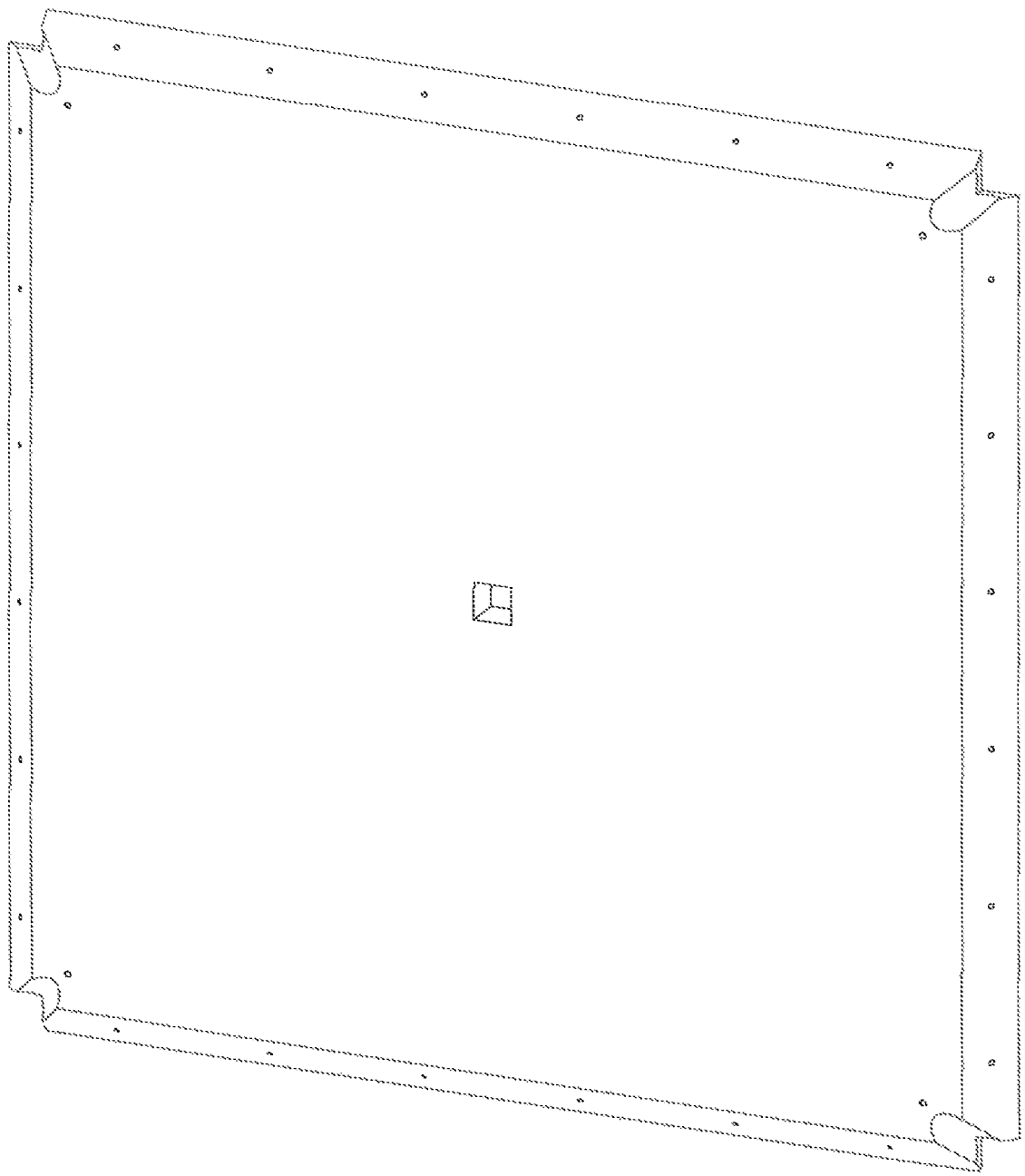
FIGS. 18-23 are isometric and sectional views showing truss panels with various examples of panel openings and enclosures (168, 170).
Figure 19:
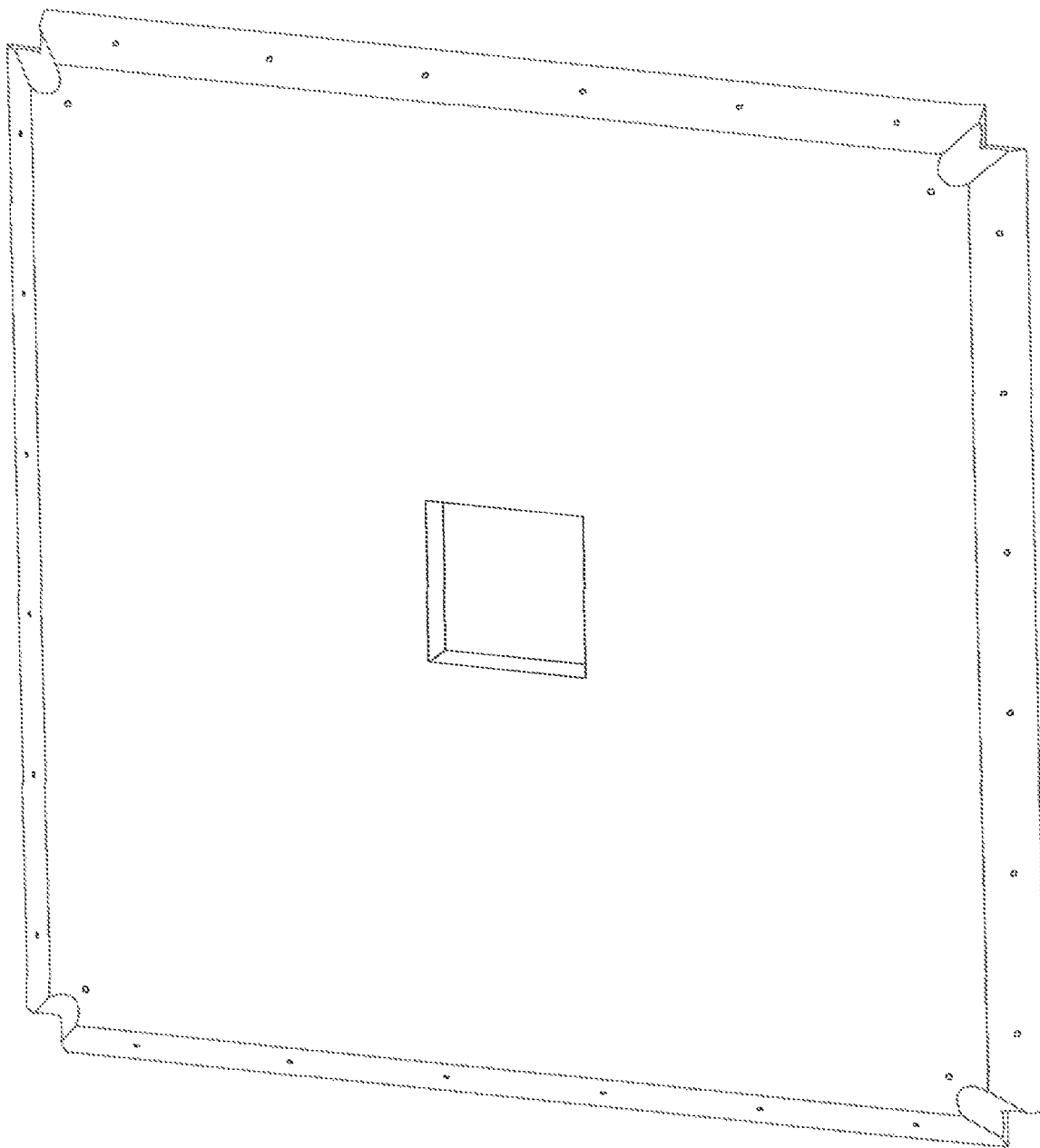
Figure 20:
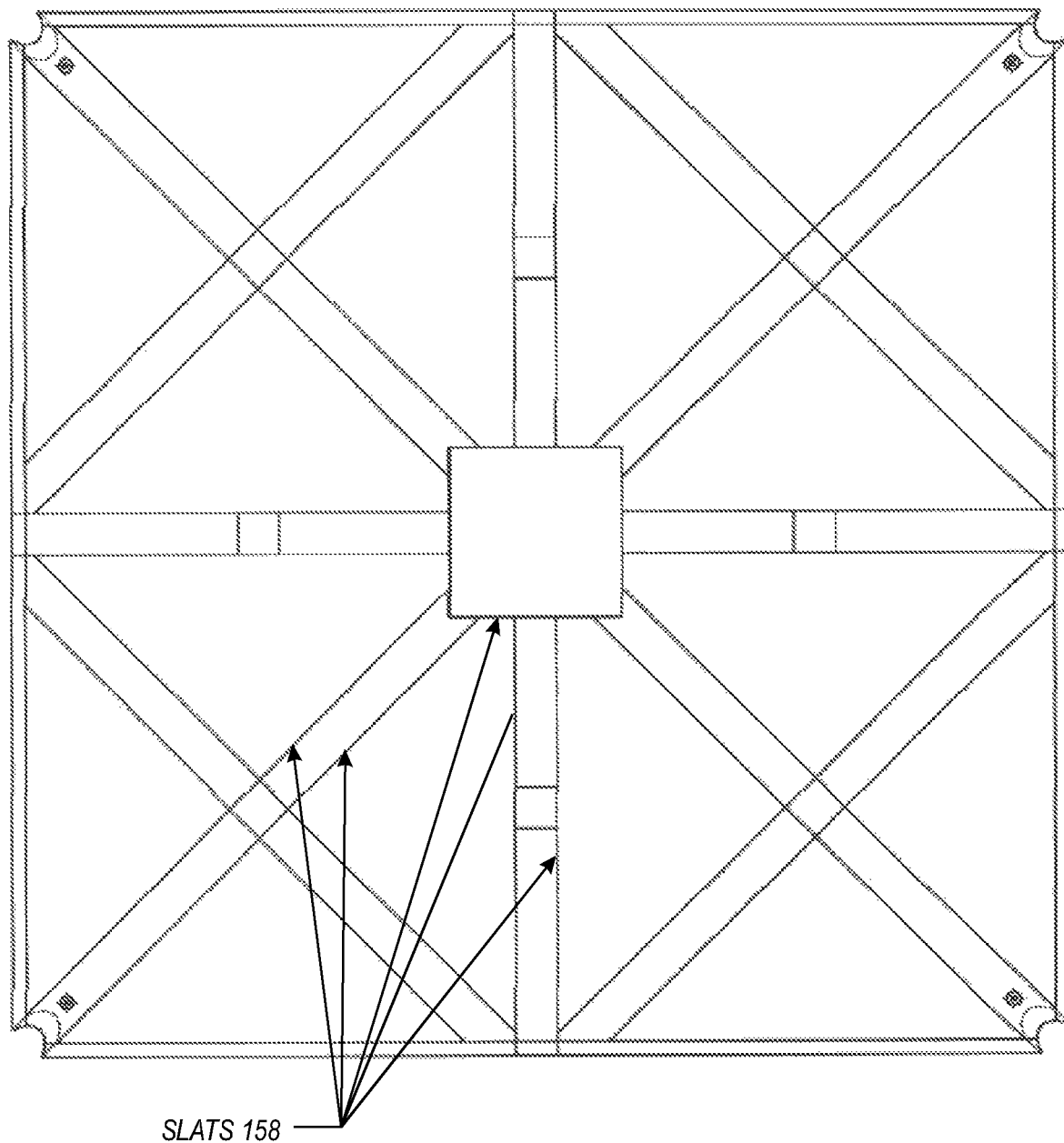
Figure 21:
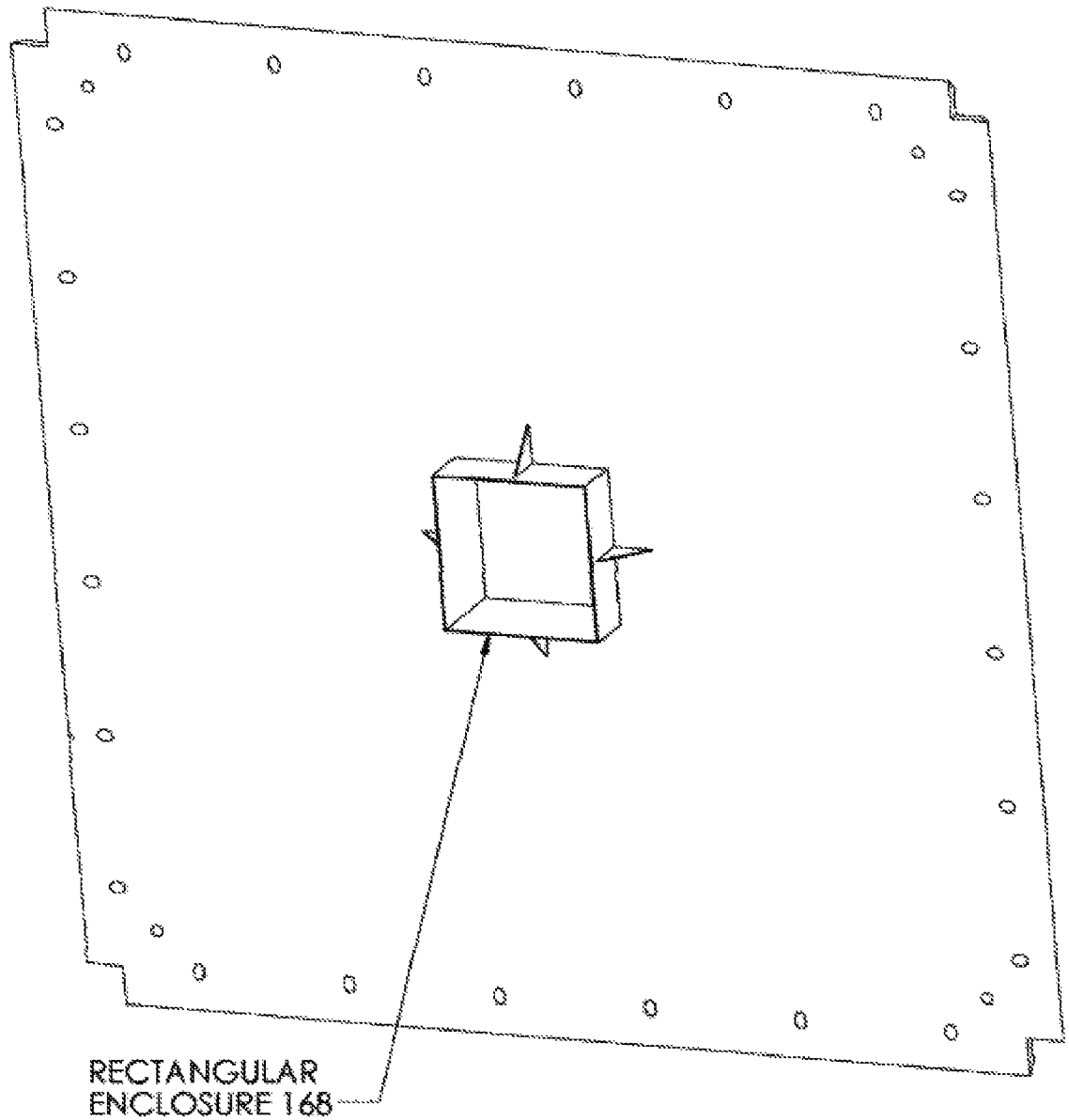
Figure 22:
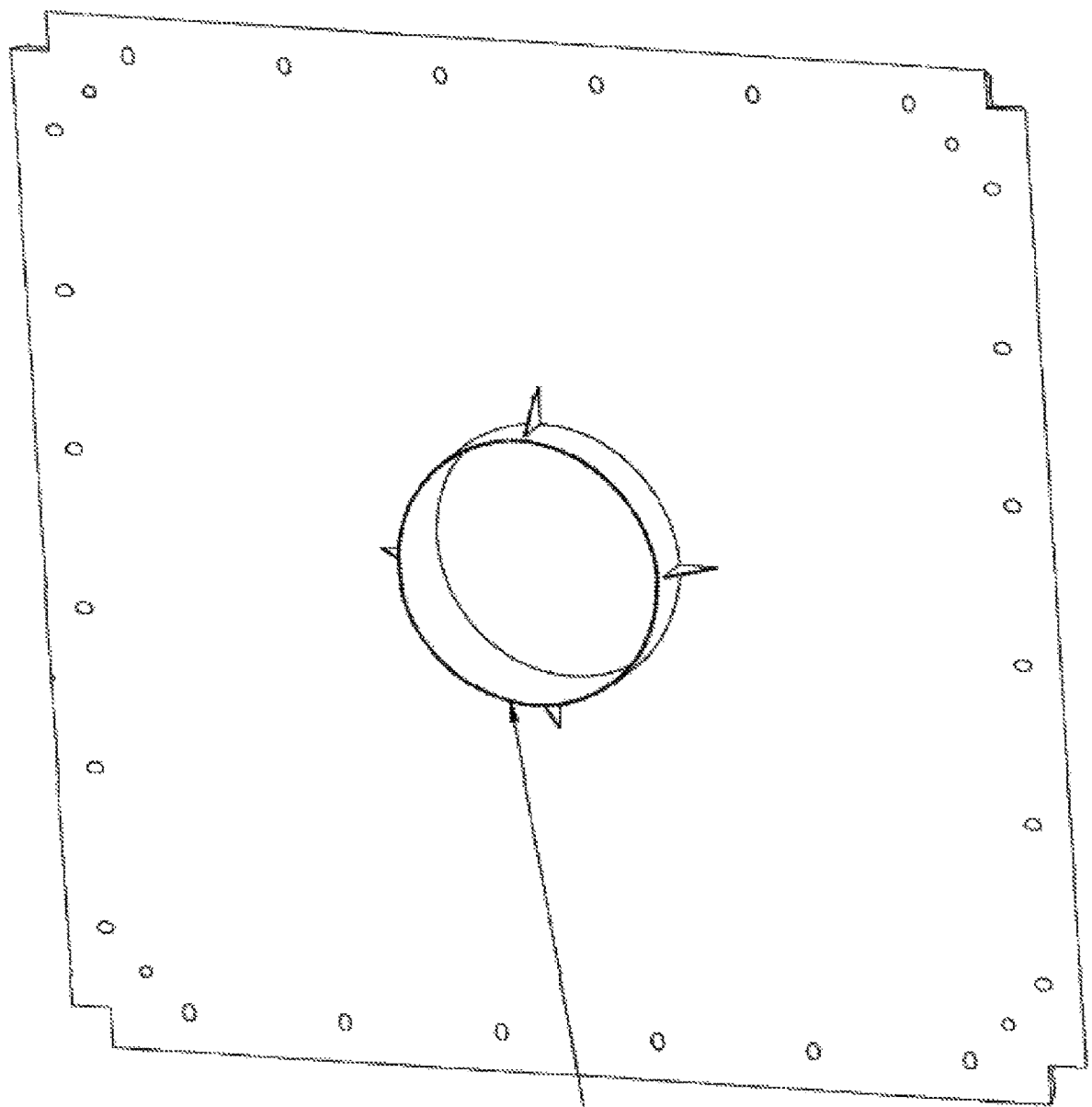
Figure 23:
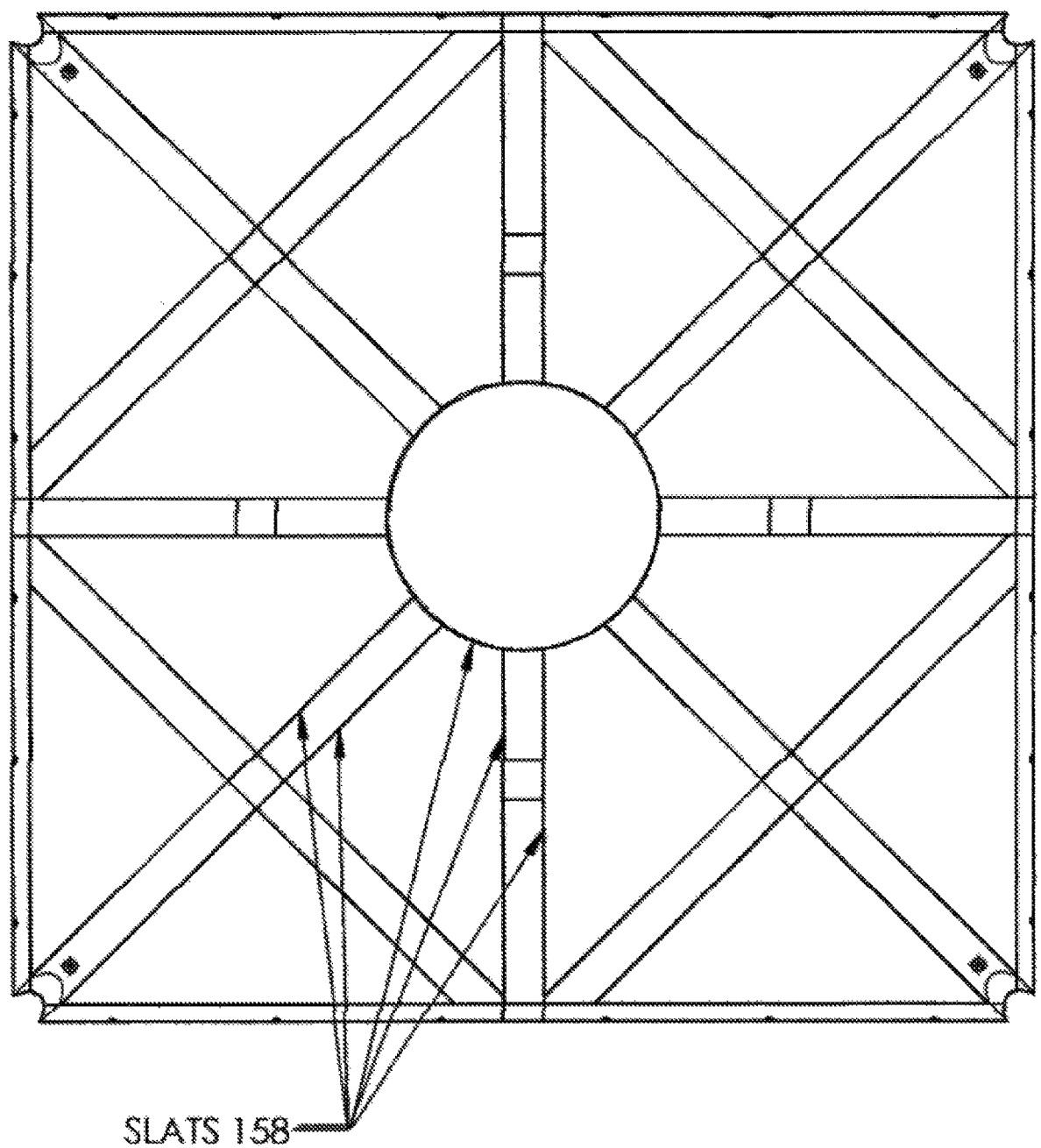

Panels may have notches (154 in FIG. 15A) formed in their corners to make corner pockets (126 in FIG. 7) in the eight corners of the cube structure. These pockets could house thrusters and their associated brackets and heat shields. Additionally, round pipes can be formed at the corners of the cube, oriented toward the center of the cube, making corner access holes (136 in FIG. 7), to allow electrical and propulsion lines to pass through from the interior. These pipes also serve as access holes to mount the corner fittings and make adjustments to the corner strut length/preload. These pipes would be integral to the panel composition and not add any parts. Panels may have holes that pass completely through both inner and outer face sheets (150 shown in FIGS. 15C and 16C). Panels may have holes that only pass through either the inner or the outer face sheet. Some holes sharing the same axis may be larger diameter on one face sheet than the other and be surrounded by a round pipe that connects the two face sheets. This is similar to a counter bore. See FIG. 10B access hole for panel-panel hardware (144) and FIG. 14 corner fitting bolt hole (128). Each panel is preferably made of one piece and this can be made possible by 3D printing. Panel large center holes, if needed, can be constrained within the intersections created by the T slats (FIG. 18), or made larger by having a larger square hole or other geometric shape surrounded by slats (FIGS. 19, 20, 23). These centralized slats can be contained within the panel face sheets as with the rest of the truss panel or extend outside the face sheets if needed to form an encasement (FIGS. 21, 22). For a panel that has a large centralized hole, its center fitting concept is the same as that described herein yet has it's mounting holes spread outside the panel centralized hole.

Mounting to Panels

Attachments of electrical units and subsystem support structures to the primary structure truss panels can be made by a wide variety of methods including the use of adhesive, bolts, rivets, snaps, ties, etc. Truss panels do not contain honeycomb, bushings, tapped holes, threaded inserts, syntactic foam, or metallic face sheet thermal/reinforcing doublers. Hot units such as amplifiers can have gaskets of thermal interface materials, such as graphite film, sandwiched between them and the panels to reduce voids and increase thermal conduction from units to panels. Also, thermal gaskets can be sandwiched between corner fittings and panels and between center fittings and panels to aid in heat conduction from panels to panels through normal and corner struts.

Launch Vehicle Interface

If this structural cube is used as a satellite primary structure module that attaches directly to a launch vehicle, and that launch vehicle has a cylinder attached to the floor of the fairing, then a thrust cylinder can be added to the satellite design. The thrust cylinder would be centered and attached to the exterior of one panel designated the "aft panel" or "bus panel". Alternately, this cylinder could be made one-piece with the panel via 3D printing (FIG. 22). Locks and springs could be incorporated between the thrust cylinder that remains with the satellite and the launch vehicle cylinder which remains with the launch vehicle. This is a traditional launch vehicle attachment method.

This inventor maintains that since the structural invention as described herein provides a lattice structure within cube exterior panels, and a truss network of struts interior to the cube, that dynamic launch loads spread fairly evenly throughout the structure, and all structural elements can be sized to efficiently and adequately handle launch loads stress and deflection requirements without the need of a thrust cylinder. This further simplifies the design. In this case, without the inclusion of a thrust cylinder, a series of spring-loaded cone-and-socket launch locks can be incorporated between the aft (bus) panel and launch vehicle fairing floor.

Separate Bus and Payload Modules

The structural cube invention described herein can be used as an entire satellite primary structure or it may be used as a single module in a satellite containing two or more modules.

Bus Module with Nucleus Fitting Replaced by Fuel Tank

Figure 24:
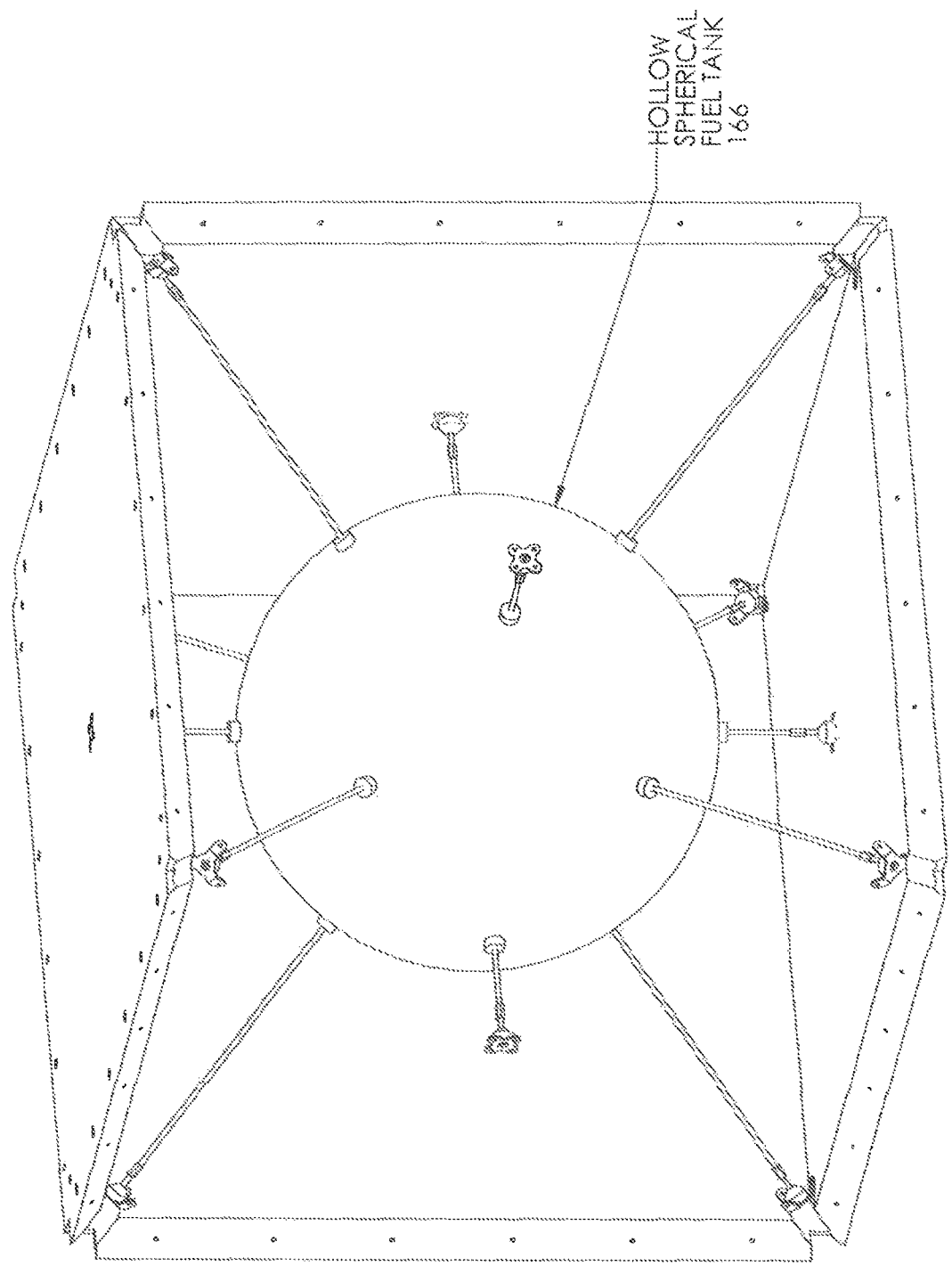
FIG. 24 is an isometric view of a cube-shaped structure with two panels removed and a spherical tank with struts.
Figure 25:
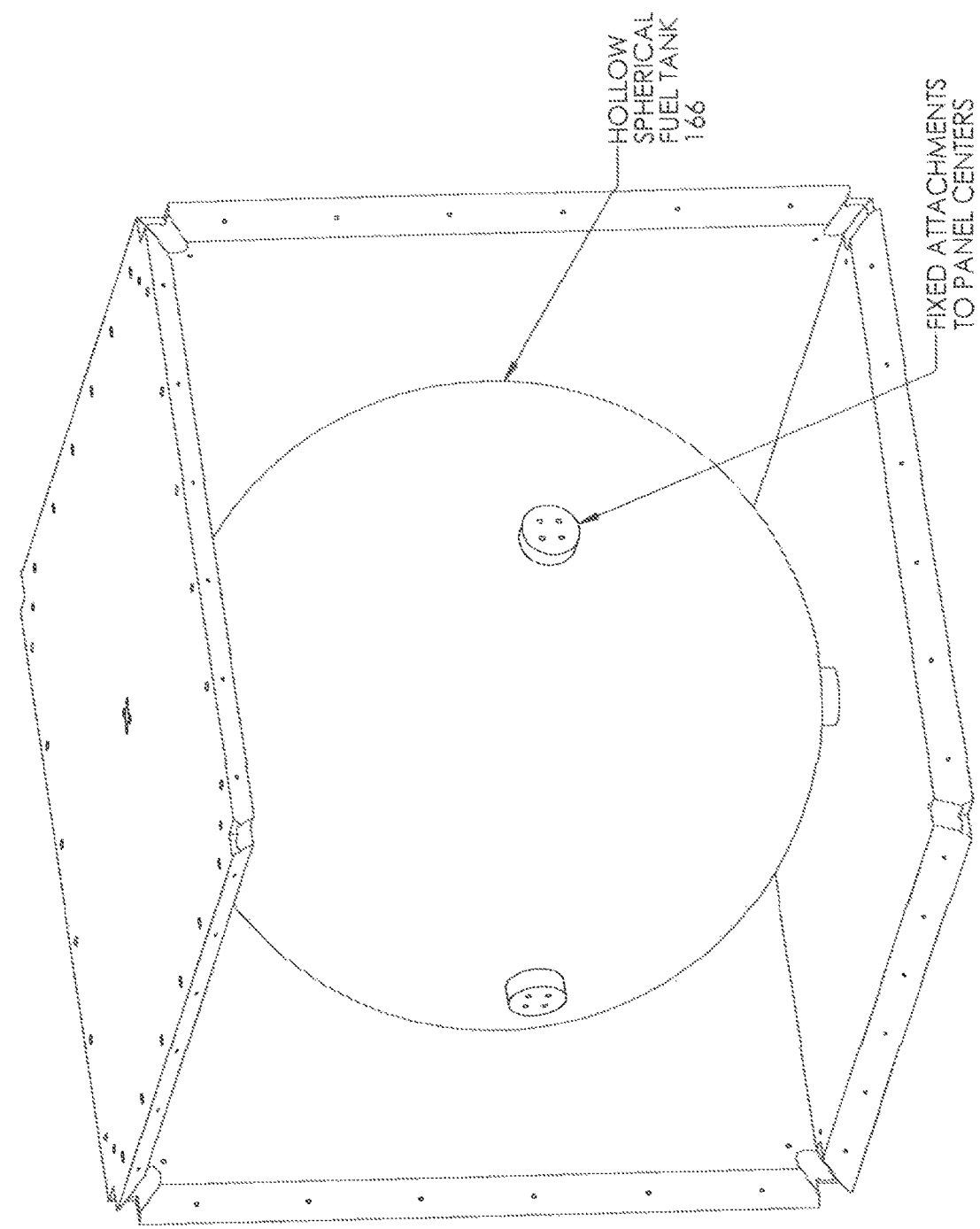
FIG. 25 is an isometric view of a cube-shaped structure with two panels removed and a spherical tank without struts.

For the case where this primary structure module houses a single fuel tank, the nucleus fitting could be replaced by a spherical fuel tank (166) that becomes part of the primary structure (see FIG. 24). The strut designs in this case would remain the same as those described herein yet would become shorter and now have the rod thread to a boss or bracket on the tank rather than the nucleus fitting. For a larger tank, an alternate to this concept, would have the spherical fuel tank (166) attach directly (without ball joints) to the panel centers, and there would be no need for any struts or corner fittings (See FIG. 25.)

Stackable Satellites

In the case of satellites stacked on top of each other within a launch vehicle fairing, the same interface that is used between the lowest satellite and the fairing floor, can be used between satellites, whether it be thrust cylinders or a series of spring-loaded cone-and-socket launch locks.

The cube-shaped satellite primary structure embodiments described above have the following unique features and improvements over prior art satellite designs. Other embodiments are also possible, as one skilled in the art would understand.

There are none of the following:
1. panels internal to the cube formed by the main six panels
2. corner posts separate from the panels
3. stiffeners external to and separate from the panels.
   These features make for a very clean primary structure that in turn enables subsystem designs to be simple and easily variable.

All panels are preferably each made of one continuous metallic piece and have internal lattice structures made up of internal beams made possible by metallic 3D printing.

In most cases, there are no needs for heat pipes internal or external to the panels since one-piece panels with internal lattices all clamped to adjacent panels and including thermal gaskets allow for high heat conduction through panels and between panels. In addition, heat will conduct through the struts from panel to panel.

There are no fittings used to attach one panel to the next—only corner fittings and panel center fittings that attach struts to panels.

Panels do not contain honeycomb metallic foil and the associated, local-strengthening syntactic foam and face sheet doublers. This reduces time and costs in design, analysis, and manufacturing.

Panels do not contain the addition of bushings and threaded inserts. Instead they only have holes that may be created during 3D printing or finish machined. Again, this constitutes a major time and cost reduction.

Struts inside the cube connect corners and panel centers to a centralized nucleus fitting or hollow sphere that brings all the struts together. This stiffens the center of each panel thereby negating the need for internal panels or added stiffeners external to panels.

Incorporation of ball sockets where struts attach to panels increases analysis accuracy and therefore makes for better prediction of structural dynamic behavior.

The nucleus fitting can also be a hollow sphere such as a fuel tank that becomes part of the main structure. If the sphere is large enough, it could mount directly to truss panel centers. In this case, there would be no need for struts and ball sockets.

Use of strut ball sockets, hex coupling nuts, and oversized panel/fitting holes allow for adjustments that compensate for manufacturing dimensional tolerances.

Struts can easily be preloaded in tension or compression as needed structurally or to compensate for manufacturing dimensional tolerances.

This is a highly symmetric structure with low part count and low part variety. This reduces the amount of design and drawing changes, saving companies a great deal of money in the long run.

Besides the thermal interface gaskets and possible strut thread adhesives, the entire structure is made from one metallic material, preferably aluminum, to minimize thermal distortions inherent with multi-material structures.

This is an inherently high stiffness-to-weight structure due to the orientation of panel internal beams and cube internal struts.

Although a thrust cylinder could be attached to this structural cube, or made integral with a one-piece truss panel, one is not required for launch vehicle attachment or between stackable satellites. Instead, these interfaces can utilize spring-loaded cone-and-socket launch locks.

This structure is easily tailored (resized) with 3D CAD, and analysis changes can follow automatically and seamlessly.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A cube-shaped satellite structure comprising:
   six truss panels each formed using one continuous metallic material, the six truss panels coupled together to form a cube shape with a hollow interior;
   wherein each truss panel further comprises:
   opposing first and second surfaces forming a rectangular panel,
   four edges, each edge tapered approximately 45 degrees to make contact with an edge of four adjacent truss panels, and
   an internal lattice structure comprised of internal slats disposed perpendicular to the first and second surfaces, the internal slats forming a diamond shaped beam coupling midpoints of adjacent edges of the truss panel, a T-shaped beam coupling the midpoints of opposite edges the truss panel, an X-shaped beam coupling opposite corners of the truss panel, and a rectangular shaped beam formed along the perimeter of the truss panel;
   four corner struts, each corner strut coupled to opposite corners of the cube-shaped satellite structure;
   three side struts, each side strut coupled to the center of opposite truss panels; and
   a nucleus fitting disposed proximate the center of the cube-shaped satellite structure, wherein each corner strut is comprised of first and second portions coupled between a corner of the cube-shaped satellite structure and the nucleus fitting, and wherein each side strut is comprised of first and second portions coupled between a center of a truss panel of the cube-shaped satellite structure and the nucleus fitting.

2. The cube-shaped satellite structure of claim 1, wherein each truss panel is formed using a metallic 3D printing process.

3. The cube-shaped satellite structure of claim 1, wherein the nucleus fitting is comprised of a 14-sided block of metal, and wherein each side of the nucleus fitting is configured to attached to one of the corner or side struts.

4. The cube-shaped satellite structure of claim 1, wherein the nucleus fitting is comprised of a spherical fuel tank.

5. The cube-shaped satellite structure of claim 1, wherein each of the corner struts are coupled to one of the corners of the cube-shaped satellite structure using a ball-socket coupling.

6. The cube-shaped satellite structure of claim 1, wherein each of the side struts are coupled to one of the truss panels of the cube-shaped satellite structure using a ball-socket coupling.

7. The cube-shaped satellite structure of claim 1, wherein the corner struts and the side struts are coupled to the nucleus fitting using a threaded coupling.

8. The cube-shaped satellite structure of claim 1, wherein adjacent tapered truss panel edges are coupled together using bolts.

9. The cube-shaped satellite structure of claim 8, further comprising thermal gaskets disposed between adjacent tapered truss panel edges.

10. A method of forming a cube-shaped satellite structure, the method comprising:
  providing six truss panels formed using one continuous metallic material, wherein each truss panel further comprises:
    opposing first and second surfaces forming a rectangular panel,
    four edges, each edge tapered approximately 45 degrees to make contact with an edge of four adjacent truss panels, and
    an internal lattice structure comprised of internal slats disposed perpendicular to the first and second surfaces, the internal slats forming a diamond shaped beam coupling midpoints of adjacent edges of the truss panel, a T-shaped beam coupling the midpoints of opposite edges the truss panel, an X-shaped beam coupling opposite corners of the truss panel, and a rectangular shaped beam formed along the perimeter of the truss panel;
  coupling the six truss panels together to form a cube shape with a hollow interior;
  providing a nucleus fitting disposed proximate the center of an assembled cube-shaped satellite structure;
  providing four corner struts having first and second portions;
  coupling each corner strut portion to a corner of the cube-shaped satellite structure and the nucleus fitting;
  providing three side struts having first and second portions; and
  coupling each side strut portion to the center of a truss panel and the nucleus fitting.

11. The method of claim 10, further comprising forming each truss panel using a metallic 3D printing process.

12. The method of claim 10, wherein the nucleus fitting is comprised of a 14-sided block of metal, and wherein each side of the nucleus fitting is configured to attached to one of the corner or side struts.

13. The method of claim 10, wherein the nucleus fitting is comprised of a spherical fuel tank.

14. The method of claim 10, further comprising coupling each of the corner struts to one of the corners of the cube-shaped satellite structure using a ball-socket coupling.

15. The method of claim 10, further comprising coupling each of the side struts to one of the truss panels of the cube-shaped satellite structure using a ball-socket coupling.

16. The method of claim 10, further comprising coupling the corner struts and the side struts to the nucleus fitting using a threaded coupling.

17. The method of claim 10, further comprising coupling adjacent tapered truss panel edges together using bolts.

18. The method of claim 17, further comprising placing thermal gaskets between adjacent tapered truss panel edges.

* * * * *